(12) United States Patent
Cunningham

(10) Patent No.: US 11,232,776 B2
(45) Date of Patent: *Jan. 25, 2022

(54) SOUNDPROOF COVER FOR VOICE DEVICES

(71) Applicant: Aaron Cunningham, Spokane, WA (US)

(72) Inventor: Aaron Cunningham, Spokane, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/941,657

(22) Filed: Aug. 12, 2020

(65) Prior Publication Data

US 2020/0380944 A1 Dec. 3, 2020

Related U.S. Application Data

(63) Continuation of application No. 16/712,623, filed on Dec. 12, 2019, which is a continuation-in-part of application No. 16/584,604, filed on Sep. 26, 2019, now Pat. No. 10,593,316, which is a continuation of application No. 16/420,579, filed on May 23, 2019, now Pat. No. 10,468,007, which is a continuation-in-part of application No. 16/398,416, filed on Apr. 30, 2019.

(60) Provisional application No. 62/838,464, filed on Apr. 25, 2019.

(51) Int. Cl.
*G10K 11/162* (2006.01)
*G10L 15/22* (2006.01)

(52) U.S. Cl.
CPC ............ *G10K 11/162* (2013.01); *G10L 15/22* (2013.01); *G10L 2015/223* (2013.01)

(58) Field of Classification Search
CPC ............... G10K 11/162; G10K 11/16; G10L 2015/223; G10L 15/22
USPC .................................................. 181/199, 198
See application file for complete search history.

(56) References Cited

U.S. PATENT DOCUMENTS

| | | | | |
|---|---|---|---|---|
| 1,805,465 A | * | 5/1931 | Clifford | G10K 11/22 181/22 |
| 7,080,816 B1 | * | 7/2006 | Vaccaro | F16M 11/18 248/530 |
| 8,189,849 B2 | * | 5/2012 | Waddell | H04R 1/02 381/388 |
| 10,468,007 B1 | * | 11/2019 | Cunningham | G10K 11/16 |
| 10,593,316 B1 | * | 3/2020 | Cunningham | G10K 11/16 |
| 2006/0076860 A1 | * | 4/2006 | Hoss | A47B 51/00 312/312 |

* cited by examiner

*Primary Examiner* — Forrest M Phillips

(57) ABSTRACT

This disclosure describes, in part, covers for electronic devices. For instance, a portion of a cover may attach to a portion of an electronic device. In some instances, the portion of the electronic device is associated with receiving sound. The cover may include one or more speakers that are configured to output sound towards one or more microphones of the electronic device. By outputting the sound towards the one or more microphones, the one or more microphones may receive more of the sound than sound (e.g., user speech) located in an environment that includes the electronic device. The cover may also include one or more microphones for generating audio data representing commands. For example, the commands may cause the cover to output the sound using the one or more speakers and/or cease outputting the sound using the one or more speakers.

20 Claims, 27 Drawing Sheets

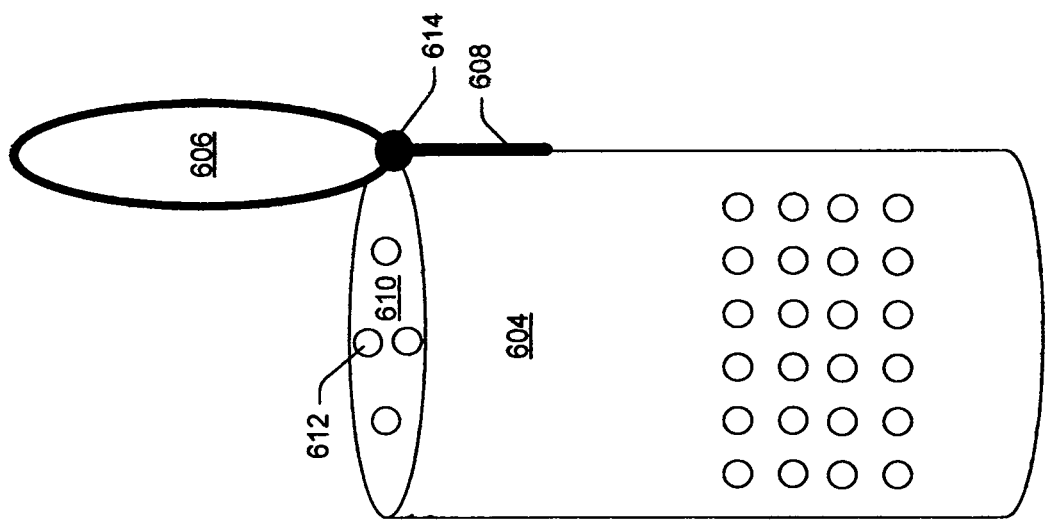
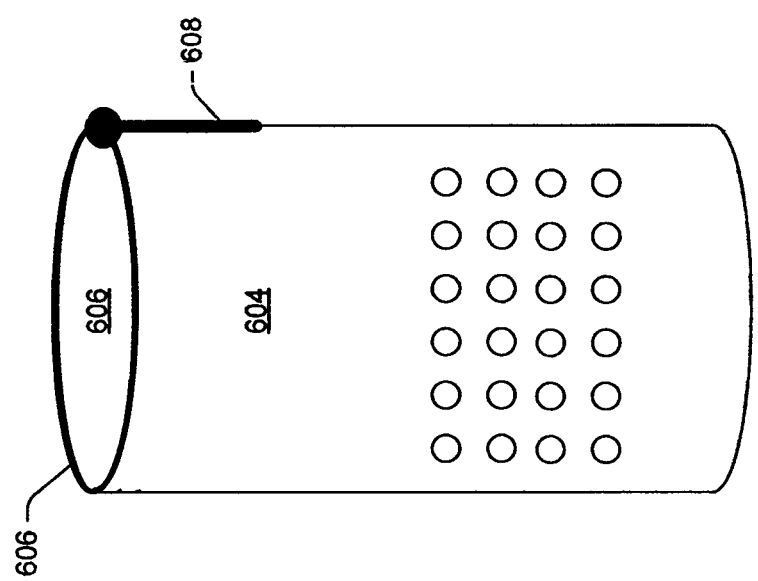
FIG. 6B
FIG. 6A

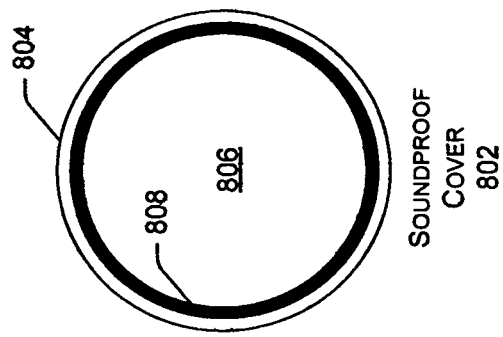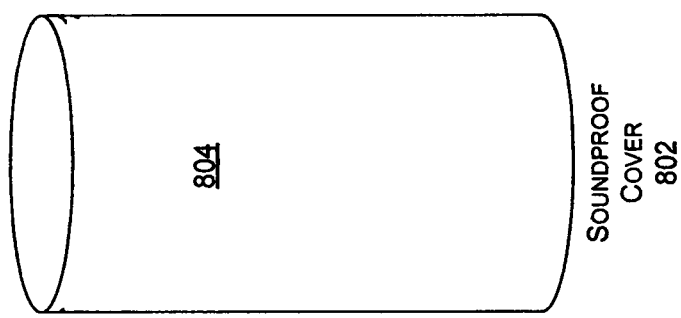
FIG. 8

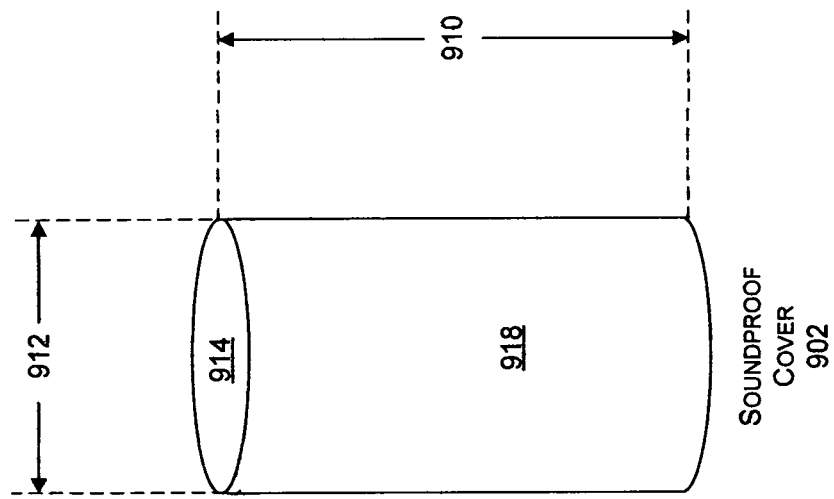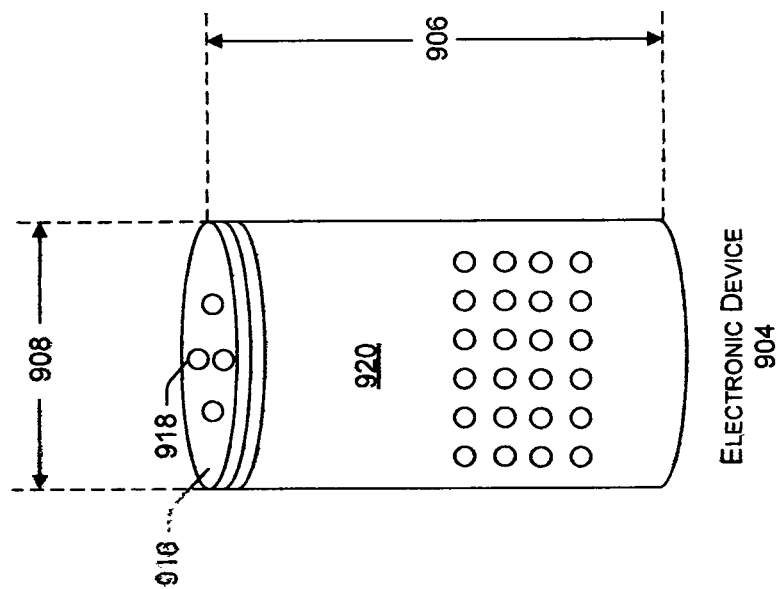
FIG. 9

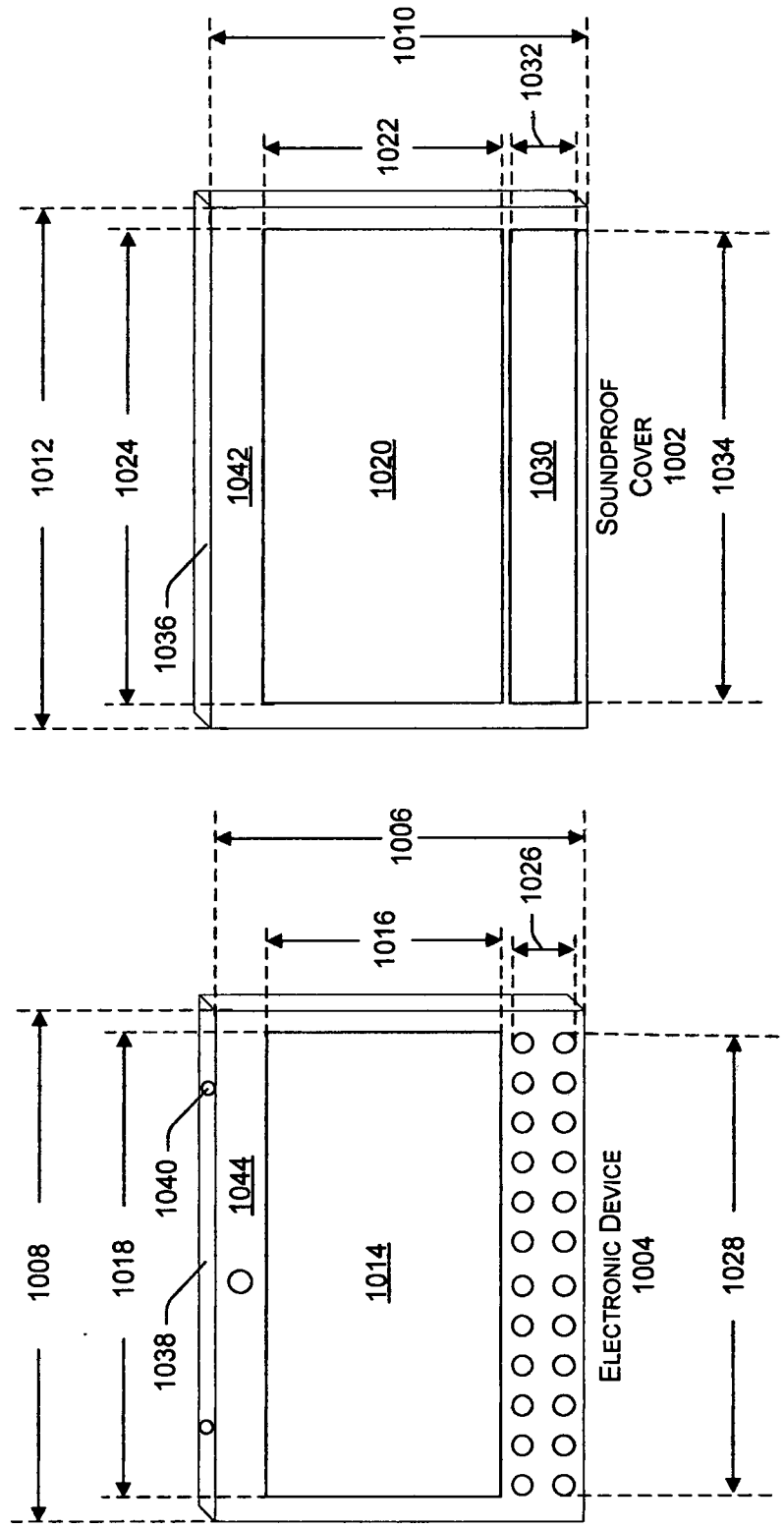

SOUNDPROOF COVER FOR VOICE DEVICES

RELATED APPLICATIONS

This application claims priority to U.S. patent application Ser. No. 16/712,623, filed on Dec. 12, 2019, titled "SOUNDPROOF CASE FOR VOICE DEVICES," which is a continuation-in-part of U.S. application Ser. No. 16/584,604, filed Sep. 26, 2019, titled "SOUNDPROOF CASE FOR VOICE DEVICES", now U.S. Pat. No. 10,593,316, which issued on Mar. 17, 2020, which is a continuation of U.S. application Ser. No. 16/420,579, filed May 23, 2019, titled "SOUNDPROOF CASE FOR VOICE DEVICES", now U.S. Pat. No. 10,468,007, which issued on Nov. 5, 2019, which is a continuation-in-part of U.S. application Ser. No. 16/398,416, filed Apr. 30, 2019, titled "SOUNDPROOF CASE FOR VOICE DEVICES", which claims priority to U.S. Provisional Patent Application Ser. No. 62/838,464, filed on Apr. 25, 2019, titled "SOUNDPROOF CASE FOR VOICE DEVICES," the entire contents of which are incorporated herein by reference.

BACKGROUND

As the processing power available to devices continues to increase, it has become practical to interact with users in new ways. For example, voice-controlled devices may include capabilities that users can activate through user speech or applications executing on mobile devices. In order for these voice-controlled devices to operate, the voice-controlled devices include microphones that capture sound, such as the user speech. The voice-controlled devices also include network components that communicate with a remote system and over a network. For example, the voice-controlled devices may send, to the remote system and over the network, audio data representing the user speech. The voice-controlled devices may then receive, from the remote system and over the network, data representing commands to be performed by the voice-controlled device.

In some instances, a user of a voice-controlled device may not want the voice-controlled device to capture the user speech and/or send the audio data representing the user speech to the remote system. However, this may be problematic, as the voice-controlled device may be configured to constantly capture and analyze the user speech listing for one or more specific triggering words. Additionally, if the user has opted into one or more services provided by the voice-controlled device, the voice-controlled device may send the audio data to the remote system.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 6A-6B illustrate schematic diagrams of a second example soundproof cover that covers a portion of an electronic device, according to various aspects of the present disclosure.

FIG. 8 illustrates a three-dimensional schematic diagram of an example soundproof cover, according to one or more examples of the present disclosure.

FIG. 9 illustrates example dimensions of an example soundproof cover, according to various examples of the present disclosure.

FIG. 10 illustrates example dimensions of another example soundproof cover, according to various examples of the present disclosure.

DETAILED DESCRIPTION

Figure 1:
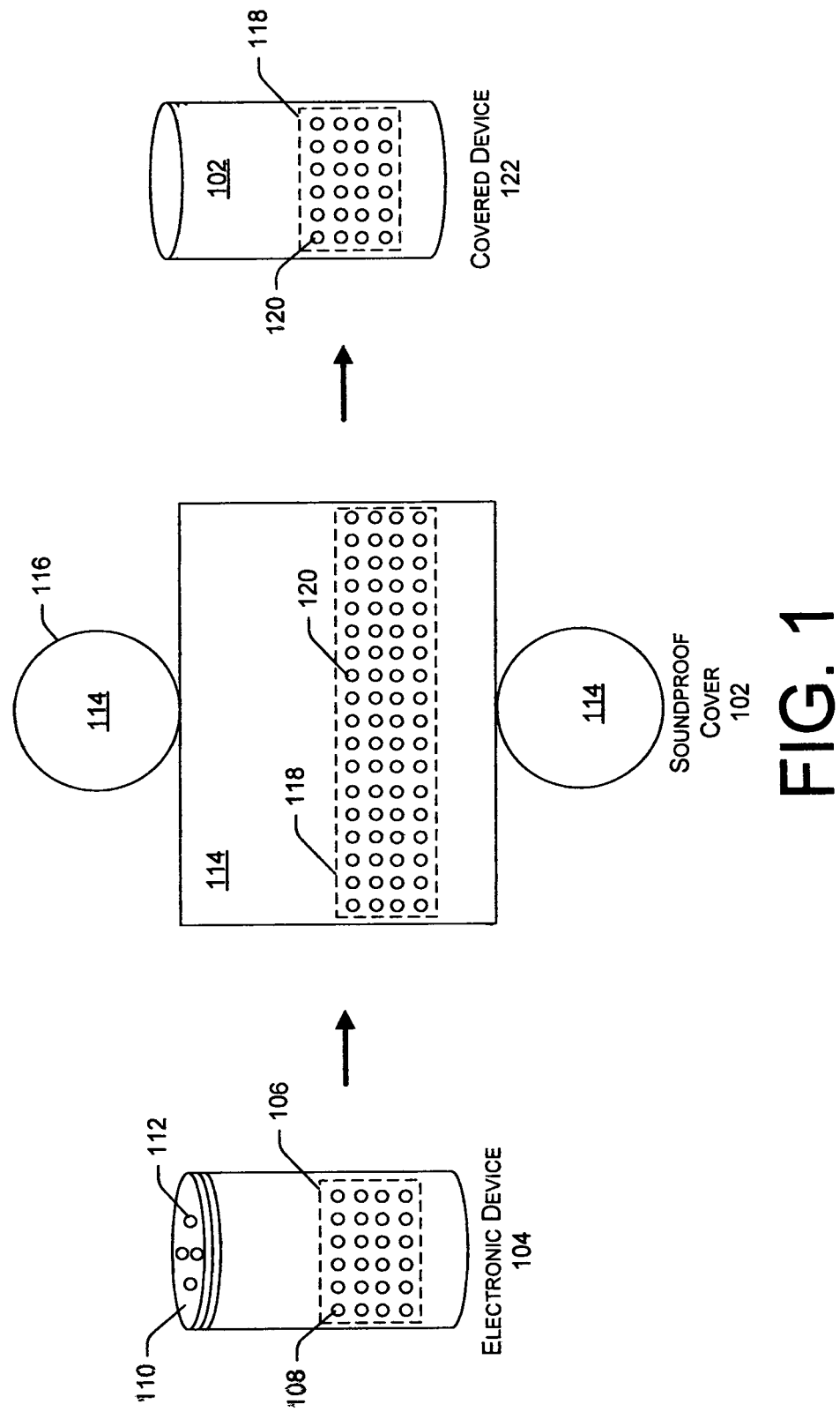
FIG. 1 illustrates a schematic diagram of an example soundproof cover that may be placed on an electronic device, according to various examples of the present disclosure.

As discussed above, a voice-controlled device may include capabilities that are activated using user speech. For example, in order for the voice-controlled device to operate, the voice-controlled device may capture user speech within the environment in which the voice-controlled device is located. The voice-controlled device may then send, to a remote system and over a network, audio data that represents the sound. In some instances, the user of the voice-controlled device may not want the voice-controlled device to capture the user speech and/or send the audio data representing the user speech to the remote system. This may be problematic since the voice-controlled device may be configured to continuously capture and analyze the user speech for one or more specific triggering words.

As such, this disclosure describes, in part, soundproof covers for voice-controlled devices that do not allow sound (referred to, in these examples, as "outside sound"), such as user speech, to reach at least the microphones of the voice-controlled devices. As such, when the soundproof covers are placed on the voice-controlled devices, the voice-controlled devices may be unable to capture the outside sound and/or generate audio data that represents the outside sound. However, in some examples, the soundproof covers may still allow the voice-controlled devices to perform other functions besides capturing the outside sound, which is described herein.

For example, at least a portion of an interior of a soundproof cover may include a soundproofing material. The soundproofing material may include, but is not limited to, barrier board, plasterboard, acoustic underlay, soundproofing glue, cellulose insulation, glass wool insulation, rock wool insulation, natural wool insulation, polyurethane foam insulation, and/or any other type of material that is configured to block at least a portion of outside sound from traveling to the voice-controlled device and/or the microphone(s) of the voice-controlled device. In some instances, to block the outside sound, the soundproofing material may reflect the energy of the outside sound and/or coverts the energy to heat. Additionally, or alternatively, in some instances, to block the outside sound, the soundproofing material may stop the vibrations caused by the outside sound from traveling to the voice-controlled device and/or the microphone(s) of the voice-controlled device. Additionally, or alternatively, in some instances, to block the outside sound, the soundproofing material may absorb at least a portion of the outside sound such that the at least the portion of the outside sound does not travel to the voice-controlled device and/or the microphone(s) of the voice-controlled device. While these are just a couple of examples of soundproofing material blocking the outside sound, in other examples, the soundproofing material may block the sound using one or more additional and/or alternative techniques.

In some instances, an entirety of the soundproof cover may include the soundproofing material. This way, the soundproof cover may block the outside sound from traveling to any portion of the voice-controlled device. In some instances, only a first portion of the soundproof cover may include the soundproofing material. For instance, the first portion of the soundproof cover may align with (e.g., be located near and/or cover) the microphone(s) of the voice-controlled device and/or the portion (e.g., the opening(s)) of the voice-controlled device that allows the outside sound to travel to the microphone(s). This way, the soundproof cover may block the outside sound from traveling to at least the microphone(s) of the voice-controlled device, but the soundproof cover may still allow other functions of voice-controlled device to operate as intended.

In some instances, the first portion of the soundproof cover, which is used to block at least a portion of the outside sound from reaching the microphone(s) of the voice-controlled device, may be configured to move from a first position to a second position. While in the first position, the soundproof cover may continue to block the outside sound from traveling to the microphone(s) of the voice-controlled device. However, while in the second position, the first portion of the soundproof cover may be open such that the soundproof cover allows the outside sound to travel to the microphone(s) of the voice-controlled device. This way, the soundproof cover may still be placed on the voice-controlled device, but the soundproof cover may still allow the user to interact with the voice-controlled device by opening the first portion of the soundproof cover.

In some instances, the soundproof cover may be designed such that the user manually moves the first portion between the first position and the second position. Additionally, or alternatively, in some instances, the soundproof cover may include a device that automatically moves the first portion between the first position and the second position. For example, the device may receive data representing commands to open or commands to close. When receiving a command to open, the device may cause the first portion to move to the first position. Additionally, when receiving a command to close, the device may cause the first portion to move to the second position. In some instances, the soundproof cover may include network interface(s) that wirelessly receive the data from one or more other electronic device via a network. In some instances, the soundproof cover may include microphone(s) that generate audio data representing the commands, where the data corresponds to the audio data. Still, in some instances, the soundproof cover may include input device(s) that receive input from the user, where the input data corresponds to the data representing the commands.

In some instances, a second portion of the soundproof cover may allow sound (referred to, in these examples, as "interior sound") being output by the voice-controlled device to travel from the speaker(s) of the voice-controlled device to outside of the soundproof cover. For example, the second portion of the cover may include opening(s), a non-soundproofing material, and/or the like that allows the interior sound to travel through the second portion of the soundproof cover. In some instances, the second portion of the soundproof cover may align with the speaker(s) of the voice-controlled device and/or the portion (e.g., the opening(s) for the speaker(s)) of the voice-controlled device that is configured for outputting the interior sound. For example, if the outer surface of the voice-controlled device includes openings that allow the interior sound to travel from the speaker(s) to outside of the voice-controlled device, then the second portion of the soundproof cover may align with the openings of the outer surface. This way, the soundproof cover may block the outside sound from traveling to the microphone(s) of the voice-controlled device, but may allow the interior sound from the speaker(s) of the voice-controlled device to travel outside of the soundproof cover.

In some instances, a third portion of the soundproof cover may allow content being displayed by the voice-controlled device to be viewed. The third portion of the soundproof cover may include, but is not limited to, an opening, a transparent material (e.g., plastic, glass, etc.), and/or the like. For example, the voice-controlled device may include a display that presents content to the user. When the cover is placed on the voice-controlled device, the third portion of the soundproof cover may at least partially align with the display of the voice-controlled device. This way, the soundproof cover may still block the outside sound from traveling to the microphone(s) of the voice-controlled device, but still allow the user to view the display of the voice-controlled device.

In some instances, the soundproof cover may include one or more attachment mechanisms that allows the soundproof cover to easily be secured around the voice-controlled device. An attachment mechanism may include, but is not limited to, zipper(s), button(s), Velcro, glue, and/or any other mechanism that allows the soundproof cover to be secured around the voice-controlled device. Additionally, in some instances, the soundproof cover may include an opening that allows a power input component, such as a power cord, to still provide power to the voice-controlled device to receive power when placed within the soundproof cover.

In some instances, various soundproof covers may be designed for specific electronic devices. For instance, a soundproof cover may include dimensions that are related to the dimensions of a specific electronic device. For a first example, if a voice-controlled device includes a cylinder shape that is ten inches long and includes a diameter of five inches, then a soundproof cover may also include a cylinder shape that is slightly longer (e.g., one millimeter, five millimeters, ten millimeters, etc.) than ten inches long and includes a diameter that is slightly longer (e.g., one millimeter, five millimeters, ten millimeters, etc.) than five inches. For a second example, if the voice-controlled device includes a cuboid shape with a first dimension that is ten inches, a second dimension that is eight inches, and a third dimension that is one inch, then a soundproof cover may also include a cuboid shape with a first dimension that is slightly longer than ten inches, a second dimension that is slightly longer than eight inches, and a third dimension that is slightly longer than one inch.

In some instances, the soundproof cover may completely cover an entirety of the voice-controlled device. In some instances, the soundproof cover may only cover a portion of the voice-controlled device. For example, the soundproof cover may cover the microphone(s) of the voice-controlled device and/or the opening(s) for the microphone(s) of the voice-controlled device, but not cover one or more other portions of the voice-controlled device. In some instances, the soundproof cover may be removable from the voice-controlled device. In some instances, the soundproof cover may not be removable form the voice-controlled device. For examples, the voice-controlled device may be designed such that the soundproof cover is part of the voice-controlled device.

In some instances, an interior portion of the soundproof cover and an exterior portion of the soundproof cover may include the soundproofing material. Additionally, or alternatively, in some instances, one or more of the interior portion of the soundproof cover or the exterior portion of the soundproof cover may include a different type of material. The different type of material may include, but is not limited to, plastic, wood, glass, metal, cotton, leather, and/or any other type of material.

As described herein, the voice-controlled device may include, but is not limited to, a television, an appliance, a mobile phone, a computer, a voice-activated device), and/or any other type of electronic device that is capable of capturing sound from an environment for which the electronic device is located. In some instances, the voice-controlled device may include, but is not limited to, microphone(s), speaker(s), a display, lighting element(s), peripheral input(s), network interface(s), processor(s), memory, and/or one or more other components.

Additionally, as described herein, the soundproofing material may include, but is not limited to, barrier board, plasterboard, acoustic underlay, soundproofing glue, cellulose insulation, glass wool insulation, rock wool insulation, natural wool insulation, polyurethane foam insulation, and/or any other type of material that is configured to block at least a portion of outside sound from traveling to the voice-controlled device and/or the microphone(s) of the voice-controlled device. In some instances, the soundproofing material may include a noise reduction coefficient (NRC) rating that exceeds a threshold NRC. The threshold NRC may include, but is not limited to, 0.5, 0.6, 0.7, 0.8, 0.9, and/or another NRC value. Additionally, or alternatively, in some instances, the soundproofing material may include a sound transmission class (STC) rating that exceeds a threshold STC. The threshold STC may include, but is not limited to, 60, 70, 80, and/or another SRC value.

FIG. 1 illustrates a schematic diagram of an example soundproof cover 102 that may be placed on an electronic device 104, according to various examples of the present disclosure. In some instances, the electronic device 104 may include a voice-controlled device that allows a user to control one or more functions of the electronic device 104 using user speech. For example, the electronic device 104 may be configured to capture outside sound, such as the user speech, using microphone(s). The electronic device 104 may then be configured to analyze audio data representing the outside sound and/or send the audio data to a remote system for analysis. In some instances, based on the analysis, the electronic device 104 may output internal sound. For instance, the internal sound may represent a response to the user speech from the user.

As shown, a first portion 106 of the electronic device 104 may include openings 108 that allow the internal sound output by the speaker(s) of the electronic device 104 to travel from within the electronic device 104 to outside of the electronic device 104. In the example of FIG. 1, the first portion 106 of the electronic device 104 is located on a top surface of the electronic device 104. Additionally, a second portion 110 of the electronic device 104 may include openings 112 that allow the outside sound to travel from outside of the electronic device 104 to the microphone(s) located within the electronic device 104. In the example of FIG. 1, the second portion 106 of the electronic device 104 is located on a second surface of the electronic device 104.

Although the example of FIG. 1 illustrates the first portion 106 of the electronic device 104 as including the openings 108 and the second portion 110 of the electronic device 104 as including the openings 112, in other examples, the first portion 106 of the electronic device 104 and/or the second portion 110 of the electronic device 104 may include a material that allows sound to travel through the first portion 106 and/or the second portion 110. Additionally, in other examples, the openings 108 and/or the openings 112 may be located on different portion(s) of the electronic device 104.

At least a portion of the interior portion of the soundproof cover 102 may include a soundproofing material 114. For example, a first portion 116 of the soundproof cover 102 may include the soundproofing material 114, where the first portion 116 of the soundproof cover 102 is configured to be aligned with the second portion 110 of the electronic device 104. In other words, a first surface of the soundproof cover 102, which includes the first portion 116, is configured to cover the first surface of the electronic device 104 that includes the openings 112. By covering the first surface of the electronic device 104, the soundproof cover 102 blocks the outside sound from traveling from outside of the electronic device 104 to the microphone(s) of the electronic device 104.

In some instances, a second portion 118 of the soundproof cover 102 may include openings 120. In the example of FIG. 1, the second portion 120 of the soundproof cover 102 may align with the first portion 106 of the electronic device 104. However, in other examples, the second portion 120 of the soundproof cover 102 may include a material that allows the interior sound to travel through the second portion 120 of the soundproof cover 102. Still, in other examples, the second portion 120 of the soundproof cover 102 may include a soundproofing material that does not allow the interior sound to travel through the second portion 120 of the soundproof cover 102.

As further illustrated in the example of FIG. 1, the soundproof cover 102 may be placed around the electronic device 104, which is illustrated as a covered device 122. When covered, the soundproof cover 102 may block the outside sound from traveling from outside of the soundproof cover 102 to the electronic device 104 and/or to the microphone(s) of the electronic device 104. Additionally, while covered, the soundproof cover 102 may still allow the interior sound from the speaker(s) of the electronic device 104 to travel from within the electronic device 104 to outside of the soundproof cover 102.

In some instances, by allowing the interior sound from the speaker(s) of the electronic device 104 to still travel outside of the soundproof cover 102, the electronic device 104 may still be able to communicate with the user. For instance, the electronic device 104 may still be able to provide the user with messages, notifications, alerts, music, and/or the like. However, the soundproof cover 102 may not allow the electronic device 104 to capture the outside sound and/or generate audio data that represents the outside sound.

As discussed above, in some instances, the openings 108 and/or the openings 112 may be located on different portion(s) of the electronic device 104. In such instances, the soundproof material 114 may located on a different portion of the soundproof cover 102 that still aligns with the openings 112 and/or the openings 120 may be located on a different portion of the soundproof cover 102 that still aligns with the openings 108.

Figure 2:
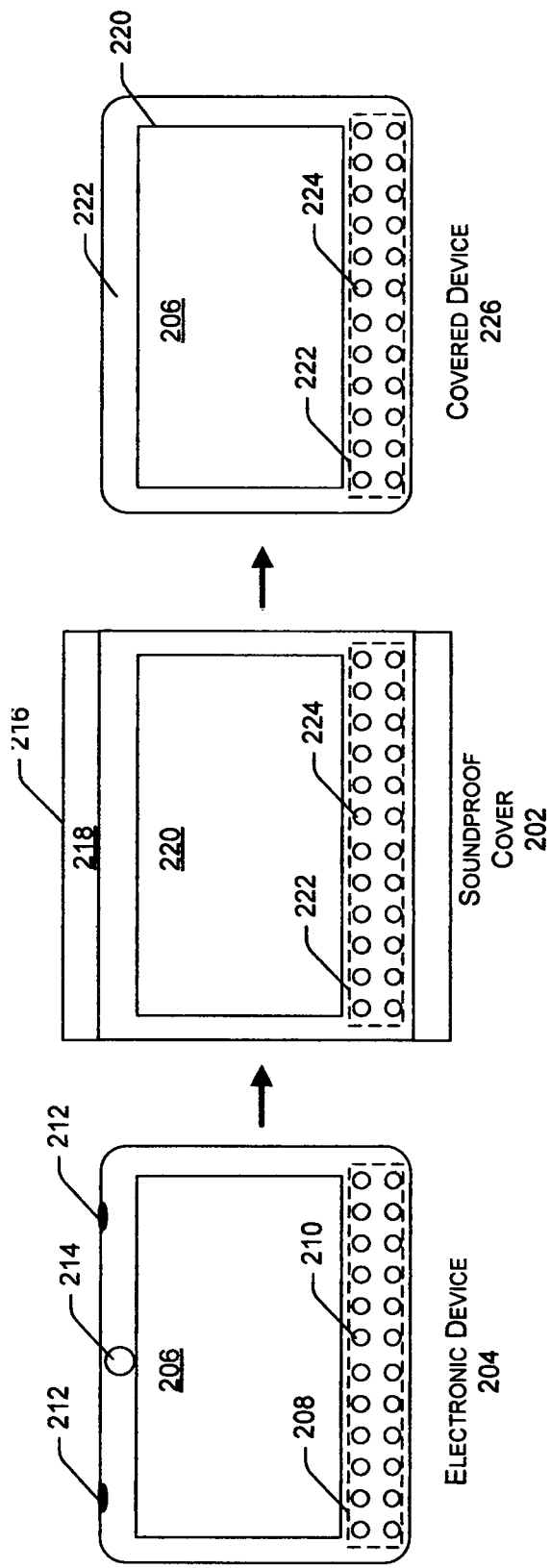
FIG. 2 illustrates a schematic diagram of an example soundproof cover that may be placed on an electronic device that includes a display, according to various examples of the present disclosure.

FIG. 2 illustrates a schematic diagram of an example soundproof cover 202 that may be placed on an electronic device 204 that includes a display 206, according to various examples of the present disclosure. In some instances, the electronic device 204 may include a voice-controlled device that allows a user to control one or more functions of the electronic device 204 using user speech. For example, the electronic device 204 may be configured to capture outside sound, such as the user speech, using microphone(s). The electronic device 204 may then be configured to analyze audio data representing the outside sound and/or send the audio data to a remote system for analysis. In some instances, based on the analysis, the electronic device 204 may output internal sound. For instance, the internal sound may represent a response to the user speech from the user. Additionally, the electronic device 204 may display content using the display 206.

As shown, a portion 208 of the electronic device 204 may include openings 210 that allow the internal sound from the speaker(s) of the electronic device 204 to travel from within the electronic device 204 to outside of the electronic device 204. Additionally, a top portion of the electronic device 204 may include openings 212 that allow the outside sound to travel from outside of the electronic device 204 to the microphone(s) located within the electronic device 204. Although the example of FIG. 2 illustrates the portion 208 of the electronic device 104 as including the openings 210 and the top portion of the electronic device 204 as including the openings 212, in other examples, the portion 208 of the electronic device 204 and/or the top portion of the electronic device 204 may include a material that allows sound to travel through portion 208 and/or the top portion. Additionally, in some instances, the openings 210 and/or the openings 212 may be located on different portion(s) of the electronic device 204.

The electronic device 204 further includes the display 206 that presents content to the user and a camera 214 for generating image data representing image(s) of an environment for which the electronic device 204 is located. For example, if the user is using the electronic device 204 to perform a video call with another user, the electronic device 204 may use the display 206 to present image(s) of the other user. Additionally, the electronic device 204 may generate image data representing the user and send the image data to a remote system and/or another electronic device being used by the other user.

At least a first portion 216 of the soundproof cover 202 may include a soundproofing material 218. In the example of FIG. 2, the first portion 216 of the soundproof cover 202 may align with the openings 212 of the electronic device 204. In other words, the first portion 216 of the soundproof device 204 is configured to cover the openings 212 of the electronic device 204 in order to block the outside sound from traveling from outside of the electronic device 204 to the microphone(s) of the electronic device 204.

Additionally, a second portion 220 of the soundproof cover 202 may allow the user to still view the display 206 when the soundproof cover 202 is placed on the electronic device 204. For example, the second portion 220 of the soundproof cover 202 may include, but is not limited to, an opening, a transparent material, and/or the like. Additionally, the second portion 220 of the soundproof cover 202 may substantially align with the display 206 of the electronic device 204.

Furthermore, a third portion 222 of the soundproof cover 202 may include openings 224 that allow the outside sound to travel from one side of the soundproof cover 202 to the other side of the soundproof cover 202. However, in other examples, the third portion 222 of the soundproof cover 202 may include a material that allows the interior sound to travel through the third portion 222 of the soundproof cover 202. Still, in other examples, the third portion 222 of the soundproof cover 202 may include a soundproofing material that does not allow the interior sound to travel through the third portion 222 of the soundproof cover 202.

As further illustrated in the example of FIG. 2, the soundproof cover 202 may be placed around the electronic device 204, which is illustrated as a covered device 226. When covered, the soundproof cover 202 may block the outside sound from traveling from outside of the soundproof cover 202 to the electronic device 204 and/or to the microphone(s) of the electronic device 204. Additionally, while covered, the soundproof cover 202 may still allow the interior sound from the speaker(s) of the electronic device 204 to travel from within the electronic device 204 to outside of the soundproof cover 202. Furthermore, while covered, the soundproof cover 202 may still allow the user to view the content being presented by the display 206 of the electronic device 204. However, the soundproof cover 202 may block the camera 214 such that the electronic device 204 is unable to generate image data representing image(s) depicting the environment for which the electronic device 204 is located.

In some instances, by allowing the interior sound from the speaker(s) of the electronic device 204 to still travel outside of the soundproof cover 202, the electronic device 204 may still be able to communicate with the user. For instance, the electronic device 204 may still be able to provide the user with messages, notifications, alerts, music, and/or the like. However, the soundproof cover 202 may not allow the electronic device 204 to capture the outside sound and/or generate audio data that represents the outside sound.

Furthermore, the electronic device 204 may output content to the user, such as image(s) using the display 206 and sound using the speaker(s) of the electronic device 204, while placed within the soundproof cover 202. In other words, the electronic device 204 may still provide the user with movies, television shows, social media, music, news, and/or the like. However, the electronic device 204 will be unable to capture the outside sound and/or generate audio data representing the outside sound.

In some instances, the display 206, openings 210, the openings 212, and/or the camera 214 may be located on different portion(s) of the electronic device 204. In such instances, the opening 220 may be located on a different portion of the soundproof cover 202 that still aligns with the display 206, the openings 214 may be located on a different portion of the soundproof cover 202 that still aligns with the openings 210, the soundproof material 218 may be located on a different portion of the soundproof cover 202 that still aligns with the openings 212, and/or a different portion of the soundproof cover 202 may be configured to cover the camera 214.

Figure 3:
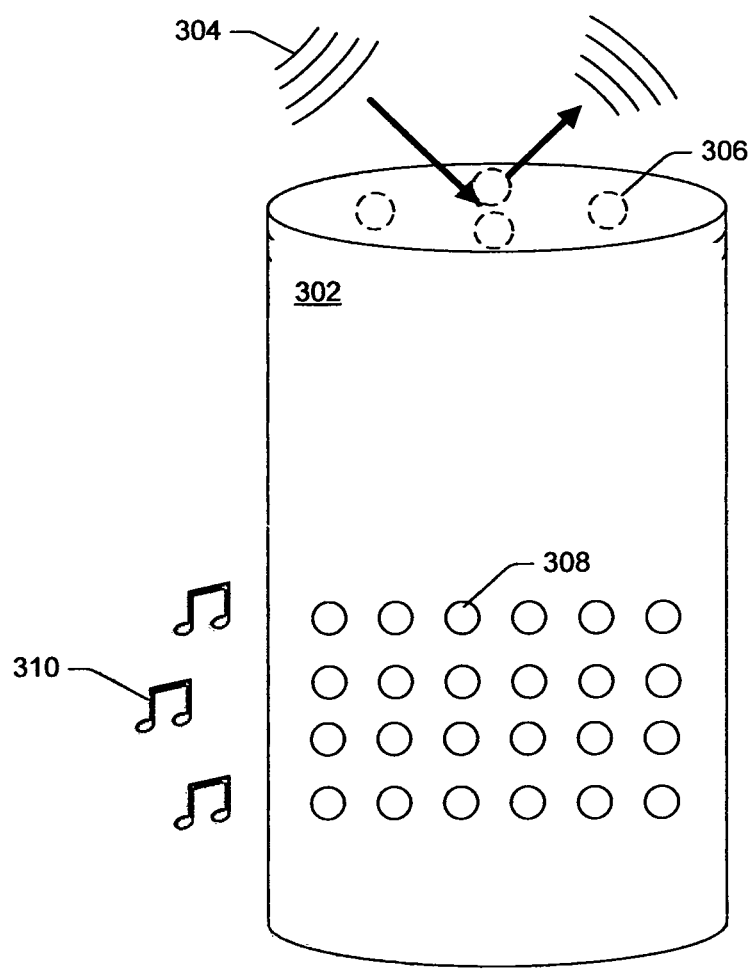
FIG. 3 illustrates a schematic diagram of an example soundproof cover blocking sound from reaching an electronic device, according to various examples of the present disclosure.

FIG. 3 illustrates a schematic diagram of an example soundproof cover 302 blocking sound from reaching an electronic device, according to various examples of the present disclosure. As shown, outside sound 304 may be located within an environment in which the electronic device is located. For example, a user may be speaking near the electronic device, where the user speech from the user is represented by the outside sound 304. The soundproof cover 302 may block the outside sound 304 from traveling from outside of the soundproof cover 302 to the microphone(s) of the electronic device. In other words, the outside sound 304 is not able to travel to the opening(s) 306 of the electronic device that are configured to bring the outside sound 304 to the microphone(s).

As further illustrated in the example of FIG. 3, the soundproof cover 302 may include openings 308 that allow interior sound 310 output by the speaker(s) of the electronic device to travel from within the electronic device to outside of the soundproof cover 302. While the example of FIG. 3 illustrates the soundproof cover 302 as including openings 308, in other examples, the soundproof cover 302 may not include the openings 310. For example, the cover 302 may block the interior sound 310 from traveling outside of the soundproof cover 302.

Figure 4C:
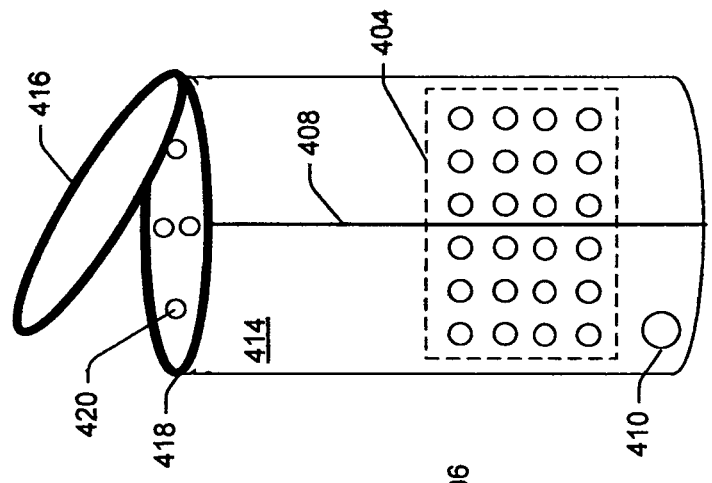
FIGS. 4A-4C illustrate schematic diagrams of various example soundproof covers that may be placed on an electronic device, according to various examples of the present disclosure.
Figure 4B:
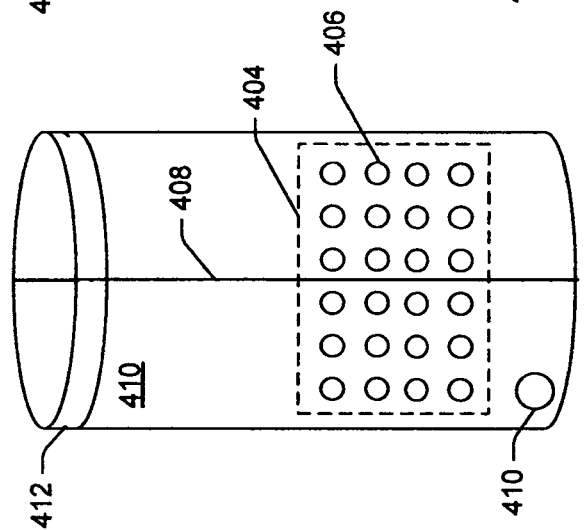
Figure 4A:
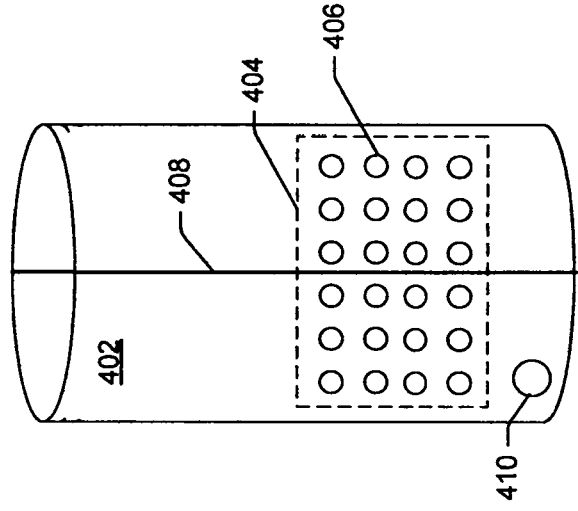

FIGS. 4A-4C illustrate schematic diagrams of example soundproof covers that may be placed on an electronic device, according to various examples of the present disclosure. In the examples of FIGS. 4A-4C, the electronic device being placed within the soundproof covers may be similar to the electronic device 104. However, in other examples, the electronic device may include any other type of device.

For instance, and as illustrated in the example of FIG. 4A, a soundproof cover 402 may include a portion 404 that allows interior sound to travel from within the soundproof cover 402 to outside of the soundproof cover 402. For instance, the portion 404 of the soundproof cover 402 may include openings 406 and/or a material that is not is soundproof. The soundproof cover 402 may further include an attachment mechanism 408 that secures the soundproof cover 402 to the electronic device. The attachment mechanism 408 may include, but is not limited to, a zipper, buttons, Velcro, glue, and/or any other mechanism that allows the cover 402 to be secured around the electronic device.

As further illustrated in the example of FIG. 4A, the soundproof cover 402 may include an opening 410 that allows the electronic device to physically connect to one or more external devices while placed within the soundproof cover 402. For a first example, the opening 410 may allow a power cord of the electronic device to extend outside of the soundproof cover 402. For a second example, the opening 410 may allow a peripheral device (e.g., speaker(s), etc.) to connect to the electronic device.

In the example of FIG. 4B, a soundproof cover 410 may be similar to the soundproof cover 402 in the example of FIG. 4A. However, the soundproof cover 410 may further include a portion 412 that aligns with one or more lights of the electronic device, such as a light ring. The portion 412 of the soundproof cover 410 may include, but is not limited to, an opening, a transparent material, and/or the like that allows light emitted by the electronic device to travel outside of the soundproof cover 410. By providing the portion 412 of the soundproof cover 410, the soundproof cover 410 allows the electronic device to still communicate with the user, such as to indicate when messages, notifications, alerts, and/or the like are available for the user.

In the example of FIG. 4C, a soundproof cover 414 may be similar to the soundproof cover 402 in the example of FIG. 4A. However, the soundproof cover 414 may further include a portion 416 that moves from a first position in which the portion 416 is closed (e.g., similar to the soundproof cover 402) to a second position in which the portion 416 is open (as illustrated in the example of FIG. 4C). In some instances, the soundproof cover 414 may include an attachment mechanism 418 that secures the portion 416 in the first position. The attachment mechanism 418 may include, but is not limited to, a zipper, buttons, Velcro, glue, and/or any other mechanism.

In some instances, the portion 416 of the soundproof cover 414 may be located over openings 420 of the electronic device that allow outside sound to travel to the microphone(s). Additionally, the portion 416 of the soundproof cover 414 may include soundproofing material. As such, when the portion 416 of the soundproof cover 414 is in the first position, the soundproof cover 414 may not allow outside sound to travel to the microphone(s) of the electronic device. However, while the portion 416 of the soundproof cover 414 is in the second position, the soundproof cover 414 may allow the outside sound to travel to the microphone(s) of the electronic device. This way, the user may communicate with the electronic device without completely removing the electronic device from the soundproof cover 414.

Figure 5B:
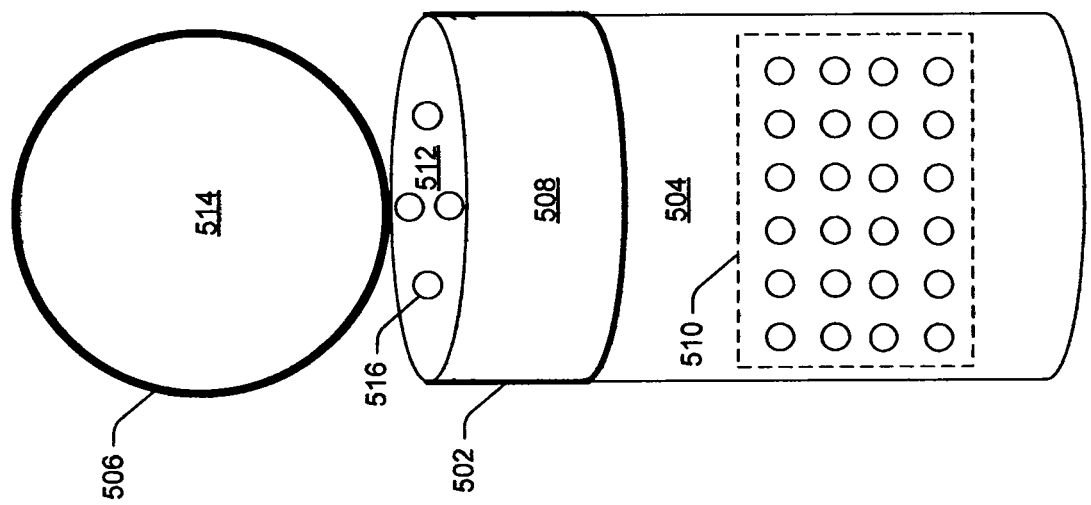
FIGS. 5A-5B illustrate schematic diagrams of a first example soundproof cover that covers a portion of an electronic device, according to various aspects of the present disclosure.
Figure 5A:
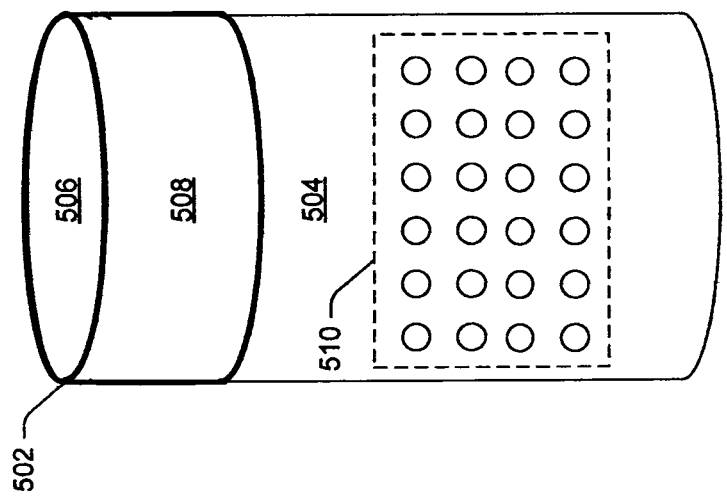

FIGS. 5A-5B illustrate schematic diagrams of a first example soundproof cover 502 that covers a portion of an electronic device 504, according to various aspects of the present disclosure. As shown, the soundproof cover 502 is located at a top portion of the electronic device 504. The soundproof cover 502 includes a first portion 506 that aligns with a top of the electronic device 504 and a second portion 508 that wraps around the top portion of the lateral sides of the electronic device 504. In some instances, both the first portion 506 and the second portion 508 of the soundproof cover 502 include soundproofing material. Additionally, or alternatively, in some instances, one or more of the first portion 506 or the second portion 508 of the soundproof cover 502 may include a material other than soundproofing material.

In some instances, the soundproofing material may be included within an inside portion of the soundproof cover 502, where the inside portion is in contact with the electronic device 504. Additionally, or alternatively, in some instances, the soundproofing material may be included on an outer portion of the soundproof cover 502, which is shown by the example of FIG. 5A. In some instances, one or more of the inside portion or the outer portion of the soundproof cover 502 may include a material other than soundproofing material.

In the example of FIG. 5A, the soundproof cover 502 does not cover a portion 510 of the electronic device 504 that is used to output the inside sound from the speaker(s) of the electronic device 504. For instance, and as shown in the example of FIG. 5A, the portion 510 of the electronic device 504 may include openings that allow the inside sound to travel from the speaker(s) to outside of the electronic device 504. By not covering the portion 510 of the electronic device 504, the electronic device 504 is still able to communicate with a user even when the soundproof cover 502 is placed on the electronic device 504.

In some instances, and as shown in the example of FIG. 5B, the soundproof cover 502 may be configured to open, exposing a portion 512 of the electronic device 504. For example, the first portion 506 of the soundproof cover 502 may be configured to move from a first position, which is illustrated in the example of FIG. 5A, to a second position, which is illustrated in the example of FIG. 5B. In the second position, the first portion 506 of the soundproof cover 502 is no longer covering the top portion 512 of the electronic device 504 with soundproofing material 514. As such, the outside sound may be able to travel from outside of the electronic device 504, through openings 516 of the electronic device 504, and to the microphone(s) of the electronic device 504. In other words, when the first portion 506 of the soundproof cover 502 is in the second position, the electronic device 504 may be able to generate audio data representing user speech.

While the examples of FIGS. 5A-5B illustrate the soundproof cover 502 covering the top portion of the electronic device 504 and the openings 516 for the microphone(s) being located at the portion 512 of the electronic device 504, in other examples, the soundproof cover 502 may cover a different portion of the electronic device 504 and/or the openings 516 may be located at a different portion of the electronic device 504. For example, the openings 516 may be located near a bottom portion of the electronic device 504 and the soundproof cover 502 may cover the bottom portion of the electronic device 504.

FIGS. 6A-6B illustrate schematic diagrams of a second example soundproof cover 602 that covers a portion of an electronic device 604, according to various aspects of the present disclosure. In the example of FIG. 6A, a portion 606 of the soundproof cover 602 covers a top portion of the electronic device 604. In some instances, the soundproof cover 602 may attach to the electronic device 604 using an attachment mechanism 608. The attachment mechanism 608 may include, but is not limited to, button(s), Velcro, glue, screws, and/or any other mechanism that allows the soundproof cover 602 to be secured around the electronic device 604. In some instances, the soundproof cover 602 is configured to be separated from the electronic device 604. In some instances, the soundproof cover 602 is not configured to be separated from the electronic device 602.

In some instances, and as shown in the example of FIG. 6B, the soundproof cover 602 may be configured to open, exposing a portion 610 of the electronic device 604. For example, the portion 606 of the soundproof cover 602 may be configured to move from a first position, which is illustrated in the example of FIG. 6A, to a second position, which is illustrated in the example of FIG. 6B. In the second position, the portion 606 of the soundproof cover 602 is no longer covering the portion 610 of the electronic device 604 with soundproofing material. As such, the outside sound may be able to travel from outside of the electronic device 604, through openings 612 of the electronic device 604, and to the microphone(s) of the electronic device 604. In other words, when the soundproof cover 602 is in the second position, the electronic device 604 may be able to generate audio data representing user speech.

In some instances, the soundproof cover 602 includes a mechanism 614 that allows the portion 606 to move between the first position and the second position. The mechanism 614 may include, but is not limited to, a pin, a flap of material, a roller, a joint, and/or any other mechanism that may allow the portion 606 to move between the first position and the second position.

While the examples of FIGS. 6A-6B illustrate the soundproof cover 602 covering the top portion of the electronic device 604 and the openings 612 for the microphone(s) being located at the portion 610 of the electronic device 604, in other examples, the soundproof cover 602 may cover a different portion of the electronic device 604 and/or the openings 612 may be located at a different portion of the electronic device 604. For a first example, the openings 612 may be located near a bottom portion of the electronic device 604 and the soundproof cover 602 may cover the bottom portion of the electronic device 604. For a second example, the openings 612 may be located along the longitudinal side of the electronic device 504 (e.g., similar to the openings for the speaker(s)) and the soundproof cover 602 may cover the openings located on the longitudinal side.

Figure 7B:
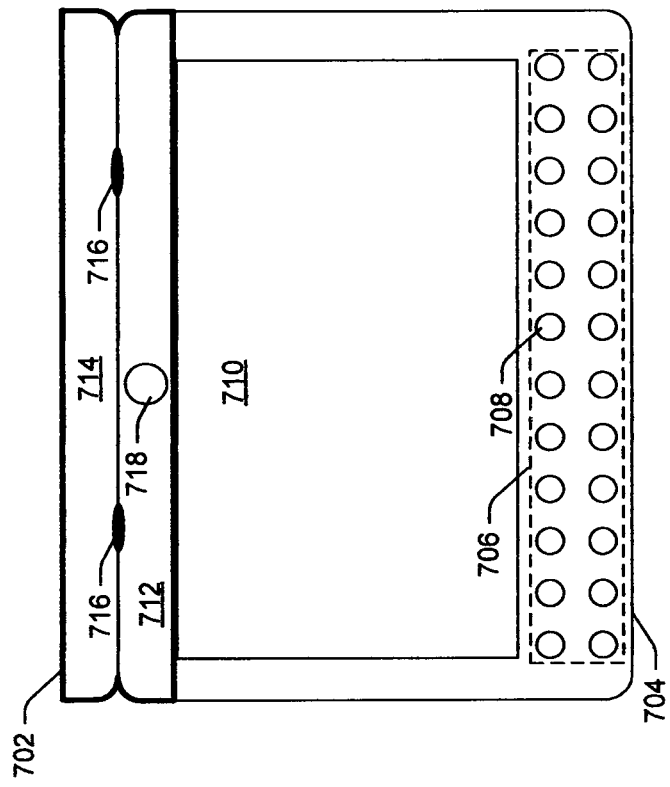
FIGS. 7A-7B illustrate schematic diagrams of a third example soundproof cover that covers a portion of an electronic device, according to various aspects of the present disclosure.
Figure 7A:
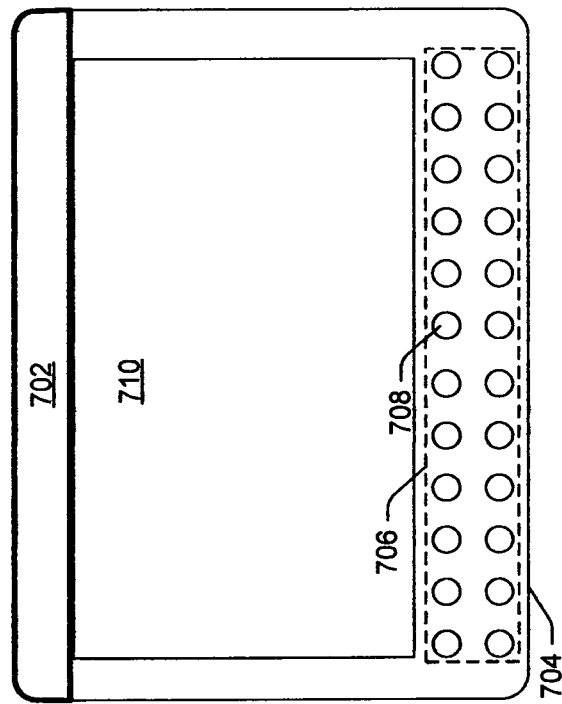

FIGS. 7A-7B illustrate schematic diagrams of a third example soundproof cover 702 that covers a portion of an electronic device 704, according to various aspects of the present disclosure. As shown, the soundproof cover 704 is located at a top portion of the electronic device 704. In some instances, the soundproofing material may be included within an inside portion of the soundproof cover 702, where the inside portion is in contact with the electronic device 704. Additionally, or alternatively, in some instances, the soundproofing material may be included on an outer portion of the soundproof cover 702, where the outer portion of the soundproof cover 702 is shown by the example of FIG. 7A. In some instances, one or more of the inside portion or the outer portion of the soundproof cover 702 may include a material other than soundproofing material.

In the example of FIG. 7A, the soundproof cover 702 does not cover a portion 706 of the electronic device 704 that is used to output the inside sound from the speaker(s) of the electronic device 704. For instance, and as shown in the example of FIG. 7A, the portion 706 of the electronic device 704 may include openings 708 that allow the inside sound to travel from the speaker(s) to outside of the electronic device 704. By not covering the portion 706 of the electronic device 704, the electronic device 704 is still able to communicate with a user even when the soundproof cover 702 is placed on the electronic device 704.

Additionally, in the example of FIG. 7A, the soundproof cover 702 does not cover a display 710 of the electronic device 704 that is used to present content. By not covering the display 710 of the electronic device 704, the electronic device 704 is still able to present content to the user even when the soundproof cover 702 is placed on the electronic device 704.

In some instances, and as shown in the example of FIG. 7B, the soundproof cover 702 may be configured to open, exposing a portion 712 of the electronic device 704. For example, a portion 714 of the soundproof cover 702 may be configured to move from a first position, which is illustrated in the example of FIG. 7A, to a second position, which is illustrated in the example of FIG. 7B. In the second position, the portion 714 of the soundproof cover 702 is no longer covering the portion 712 of the electronic device 704, such as with soundproofing material. As such, the outside sound may be able to travel from outside of the electronic device 704, through openings 716 of the electronic device 704, and to the microphone(s) of the electronic device 704. In other words, when the portion 714 of the soundproof cover 702 is in the second position, the electronic device 704 may be able to generate audio data representing user speech.

Additionally, in some instances, while the portion 714 of the soundproof cover 702 in the second position, a camera 718 of the electronic device 702 may be exposed. As such, when the portion 714 of the soundproof cover 702 is in the second position, the electronic device 704 may further be able to generate image data representing an environment for which the electronic device 704 is located. In other words, the user of the electronic device 704 is able to perform at least video calls with other users while the portion 714 of electronic device 704 is in the second position. However, while the portion 714 of the electronic device 704 is in the first position, the electronic device 704 may be unable to generate the image data representing the environment.

While the examples of FIGS. 7A-7B illustrate the soundproof cover 702 covering the top portion of the electronic device 704, in other examples, the soundproof cover 702 may cover a different portion of the electronic device 704. For example, the openings 716 may be located near a bottom portion of the electronic device 704 and the soundproof cover 702 may cover the bottom portion of the electronic device 704.

FIG. 8 illustrates a schematic diagram of an example soundproof cover 802, according to one or more examples of the present disclosure. An outer portion 804 of the soundproof cover 802 may include, but is not limited to, plastic, wood, glass, metal, cotton, leather, and/or any other type of material. In some instances, the outer portion 804 of the soundproof cover 802 may include one solid color (e.g., red, blue, white, orange, green, black, etc.) and/or the outer portion 804 of the soundproof cover 802 may include one or more designs. As such, the user may be able to select a custom color and/or design for the soundproof cover 802.

As further illustrated in the example of FIG. 8, the soundproof cover 802 may include an opening 806 for receiving the electronic device. At least a portion of an interior surface 808 of the soundproof cover 802 may include one or more soundproofing materials. The thickness of the one or more soundproofing materials may include, but is not limited to, one centimeter, five centimeters, ten centimeters, and/or any other thickness that is sufficient to block at least a portion of the outside sound from reaching the electronic device and/or the microphones of the electronic device.

FIG. 9 illustrates dimensions of an example soundproof cover 902, according to various examples of the present disclosure. For instance, an electronic device 904 may include a substantially cylinder shape that includes a first dimension 906 associated with a length of the electronic device 904 and a second dimension 908 associated with a diameter of the electronic device 904. Additionally, the soundproof cover 902 may include a substantially cylinder shape that includes a third dimension 910 associated with a length of the soundproof cover 902 and a fourth dimension 912 associated with a diameter of the soundproof cover 902.

In some instances, the third dimension 910 of the soundproof cover 902 is slightly longer than the first dimension 906 of the electronic device 904. Additionally, the fourth dimension 912 of the soundproof cover 902 is slightly longer than the second dimension 908 of the electronic device 904. As described herein, a dimension may be slightly longer than another dimension when the dimension is within a threshold distance to the other dimension, such as, but not limited to, one millimeter, five millimeters, ten millimeters, and/or the like longer. By having the dimensions of the soundproof cover 902 be slightly longer than the dimensions of the electronic device 904, the soundproof cover 902 may secure tightly around the electronic device 902. In some instances, this may increase the ability of the soundproof cover 902 to block the outside sound from traveling to the microphone(s) of the electronic device 904.

By using the dimensions illustrated in the example of FIG. 9, a first portion 914 (e.g., a first surface) of the soundproof cover 902 covers a first portion 916 (e.g., a first surface) of the electronic device 904, where the first portion 916 of the electronic device 904 includes openings 918 for receiving the outside sound. The first portion 914 of the soundproof cover 902 may include one or more soundproofing materials. Additionally, a second portion 918 (e.g., a second surface) of the soundproof cover 902 covers a second portion 920 (e.g., a second surface) of the electronic device 904. At least some of the second portion 918 of the soundproof cover 902 may include one or more soundproofing materials. In some instances, at least some of the second portion 918 of the soundproof cover 902 may not include soundproofing material and/or may include openings for allowing the inside sound from the electronic device 904 to travel outside of the soundproof cover 902.

FIG. 10 illustrates dimensions of another example soundproof cover 1002, according to various examples of the present disclosure. For instance, an electronic device 1004 may include a substantially cuboid shape that includes a first dimension 1006 associated with a length of the electronic device 1004 and a second dimension 1008 associated with a width of the electronic device 1004. Additionally, the soundproof cover 1002 may include a substantially cuboid shape that includes a third dimension 1010 associated with a length of the soundproof cover 1002 and a fourth dimension 1012 associated with a width of the soundproof cover 1002. In some instances, the third dimension 1010 of the soundproof cover 1002 is slightly longer than the first dimension 1006 of the electronic device 1004. Additionally, the fourth dimension 1012 of the soundproof cover 1002 is slightly longer than the second dimension 1008 of the electronic device 1004.

Additionally, the electronic device 1004 may include a display 1014 that includes a fifth dimension 1016 associated with a length of the display 1014 and a sixth dimension 1018 associated with a width of the display 1014. The soundproof cover 1002 may include a first portion 1020 that allows viewing the display 1014, where the first portion 1020 includes a seventh dimension 1022 associated with a length of the first portion 1020 and an eighth dimension 1024 associated with a width of the first portion 1020. In some instances, the seventh dimension 1022 of the soundproof cover 1002 may be the same as the fifth dimension 1016 of the electronic device 1004 and/or the eighth dimension 1024 of the soundproof cover 1002 may be the same as the sixth dimension 1018 of the electronic device 1004. Additionally, or alternatively, in some instances, the seventh dimension 1022 of the soundproof cover 1002 may be slightly different than the fifth dimension 1016 of the electronic device 1004 and/or the eighth dimension 1024 of the soundproof cover 1002 may be slightly different than the sixth dimension 1018 of the electronic device 1004.

Furthermore, the electronic device 1004 may include a portion for outputting the interior sound that includes a ninth dimension 1026 associated with a length of the portion and a tenth dimension 1028 associated with a width of the portion. The soundproof cover 1002 may include a second portion 1030 that allows the outputting of the interior sound, where the second portion 1030 includes an eleventh dimension 1032 associated with a length of the second portion 1030 and a twelfth dimension 1034 associated with a width of the second portion 1034. In some instances, the eleventh dimension 1032 of the soundproof cover 1002 may be the same as the ninth dimension 1026 of the electronic device 1004 and/or the twelfth dimension 1034 of the soundproof cover 1002 may be the same as the tenth dimension 1028 of the electronic device 1004. Additionally, or alternatively, in some instances, the eleventh dimension 1032 of the soundproof cover 1002 may be slightly different than the ninth dimension 1026 of the electronic device 1004 and/or the twelfth dimension 1034 of the soundproof cover 1002 may be slightly different than the tenth dimension 1028 of the electronic device 1004.

In some instances, a back portion of the soundproof cover 1002 may include similar dimensions as the front portion of the soundproof cover 1002, as illustrated in the example of FIG. 10. For example, a dimension associated with a length of the back portion may be the same as the third dimension 1010 and a dimension associated with a width of the back portion may be the same as the fourth dimension 1012. However, in some instances, the back portion of the soundproof cover 1002 may not include any openings.

Although not illustrated in the example of FIG. 10 for clarity reasons, the electronic device 1004 may include a dimension associated with a depth of the electronic device. Additionally, the soundproof cover 1002 may include a dimension associated with a depth of the soundproof cover 1002. In some examples, a length of the dimension of the depth of the soundproof device 1002 is slightly longer than a length of the dimension of the depth of the electronic device 1004.

By using the dimensions illustrated in the example of FIG. 10, a third portion 1036 (e.g., a first surface) of the soundproof cover 1002 covers a first surface 1038 of the electronic device 1004, where the first surface 1038 includes the openings 1040 for receiving the outside sound. The third portion 1036 of the soundproof cover 1002 may include one or more soundproofing materials. Additionally, a fourth portion 1042 (e.g., a second surface) of the soundproof cover 1002 covers a second surface 1044 of the electronic device 1004, where the fourth portion 1042 of the soundproof cover 1002 includes the first portion 1020 and the second portion 1030. At least some of the fourth portion 1042 of the soundproof cover 1002 may include one or more soundproofing materials. In some instances, at least some of the fourth portion 1042 of the soundproof cover 1002 may not include soundproofing material.

Figure 11A:
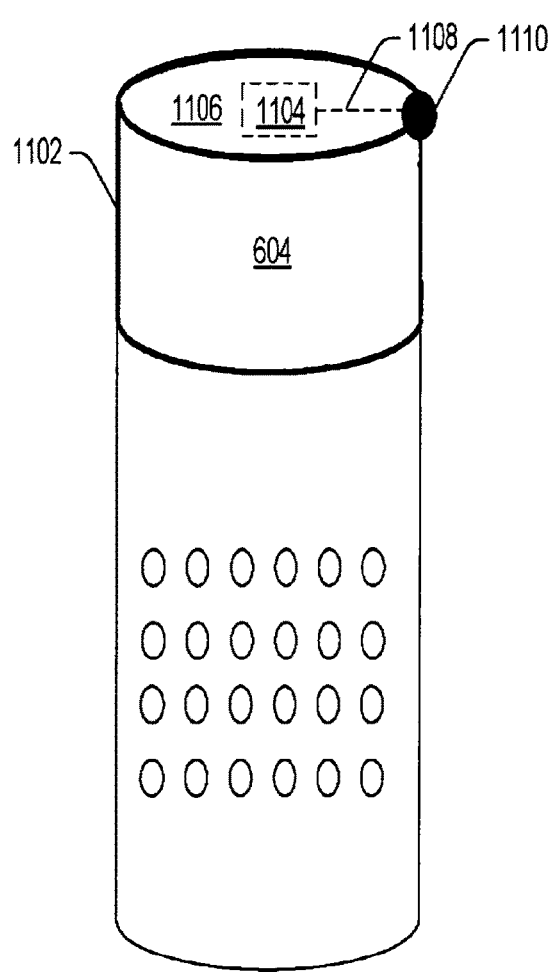
FIGS. 11A-11B illustrate a schematic diagram of an example soundproof device that includes a device for opening or closing a portion of the soundproof device, according to various examples of the present disclosure.
Figure 11B:
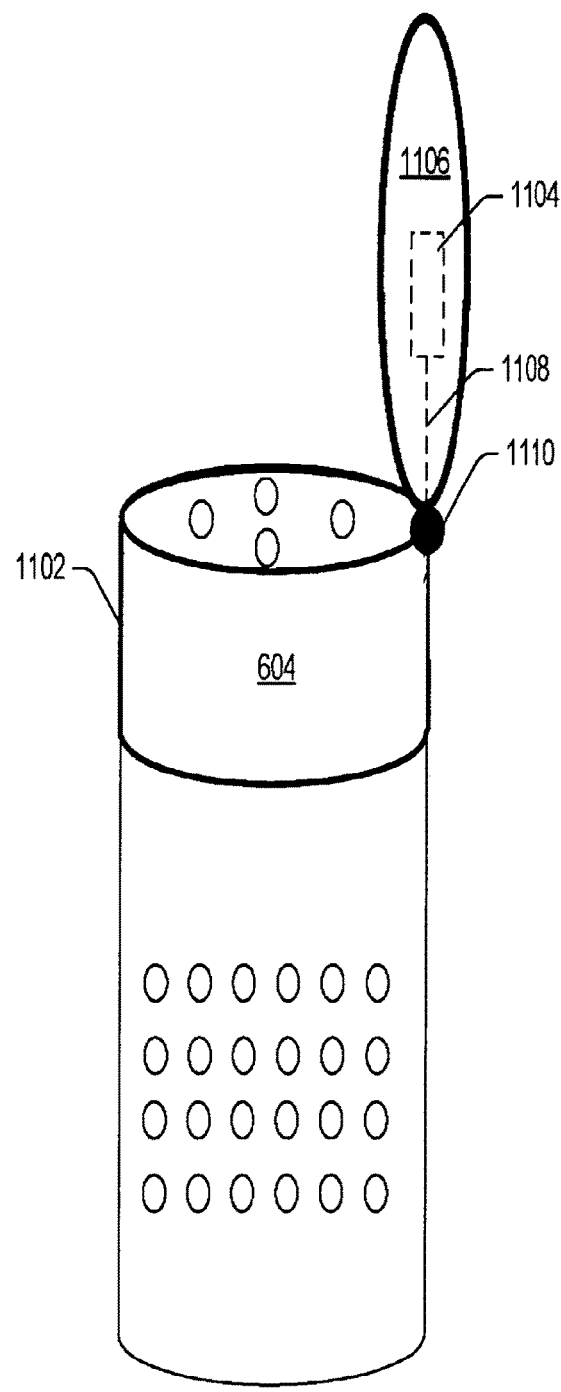

FIGS. 11A-11B illustrate a schematic diagram of an example soundproof device 1102 that includes a device 1104 for opening or closing a first portion 1106 of the soundproof device 1102, according to various examples of the present disclosure. For instance, the device 1104 may receive data representing a command to open or a command to close. In some instances, the device 1104 includes network interface(s) that receive the data via a network connection, such as from another electronic device. In some instances, the device 1104 includes speaker(s) that generate data representing user speech, where the user speech represents the command to open or the command to close. Still, in some instances, the device 1104 may receive, using input device(s), input representing the command to open or the command to close. While these are just a couple of examples of how the device 1104 may receive the data, in other examples, the device 1104 may receive the data using one or more additional and/or alternative techniques.

As shown, the device 1104 may include a mechanical connection 1108 with a mechanism 1110. The mechanism 1110 controls the first portion 1106 of the soundproof cover 1102 to move between the first position (e.g., closed position), as illustrated in the example of FIG. 11A, and the second position (e.g., open position), as illustrated in the example of FIG. 11B. The mechanism 1110 may include, but is not limited to, a pin, a roller, a joint, and/or any other device that is capable of moving the first portion 1106 of the soundproof device 1102 between the first position and the second position.

In some instances, the device 1104 may automatically cause the first portion 1106 of the soundproof cover 1102 to open and/or close based on the occurrence of one or more events. For a first example, the device 1104 may cause the first portion 1106 to open when the speaker(s) are outputting interior sound, but cause the first portion 1106 to close when the speaker(s) are not outputting the interior sound. For a second example, the device 1104 may cause the first portion 1106 to open when the electronic device has a message for a user, but cause the first portion 1106 to close when the electronic device does not have a message for the user.

For a third example, and in examples where the electronic device includes a display, the device 1104 may cause the first portion 1106 to open when the electronic device is presenting content using the display, but cause the first portion 1106 to close when the electronic device is not presented content using the display. For a fourth example, the device 1104 may cause the first portion 1106 to open during first time(s), but cause the first portion 1106 to close during second time(s). As described herein, times may include, but are not limited to, times of the day, times of the week, times of the year, and/or the like.

Figure 12:
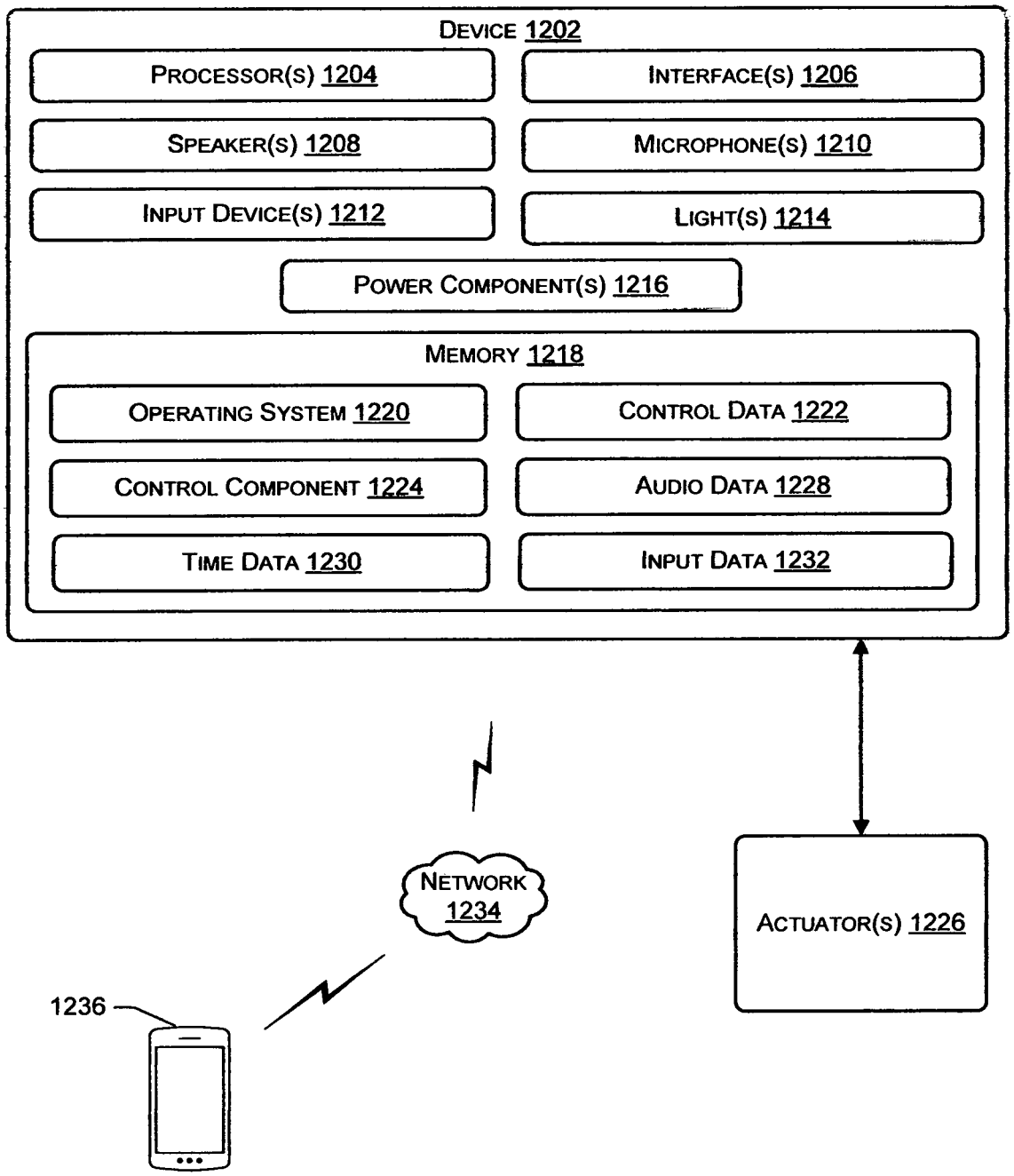
FIG. 12 illustrates a block diagram of an example device that may be included in a soundproof cover, according to various examples of the present disclosure.

FIG. 12 illustrates a block diagram of an example device 1202 that may be included in a soundproof cover, according to various examples of the present disclosure. As shown, the device 1202 includes processor(s) 1204, network interface(s) 1206, speakers 1208, microphone(s) 1210, input device(s) 1212, light(s) 1214, power component(s) 1216, and memory 1218. In some instances, the device 1202 may include one or more additional components not illustrated in the example of FIG. 12. Additionally, or alternatively, in some instances, the device 1202 may not include one or more of the network interface(s) 1206, the speakers 1208, the microphone(s) 1210, the input device(s) 1212, the light(s) 1214, or the power component(s) 1216.

The microphone(s) 1210 may include sensors (e.g., transducers) configured to receive sound. The microphone(s) 1210 may generate input signals for audio input (e.g., sound). For example, the microphone(s) 1210 may determine digital input signals for an utterance of a user. In some instances, the microphone(s) 1210 are implemented in an array. The array may be arranged in a geometric pattern, such as a linear geometric form, circular geometric form, or any other configuration.

The input device(s) 1212 may include button(s), key(s), joystick(s), touch-sensitive pad(s), trigger(s), sensor(s) that detect movement of the device 1202 (e.g., accelerometer(s), magnetometer(s), etc.), and/or any other type of device that is able to receive input from the user. The power component(s) 1216 may be configured to provide power to the device 1202. For a first example, the power component(s) 1216 may include one or more batteries. In some instances, the one or more batteries may be rechargeable. For a second example, the power component(s) 1216 may include components connected to a source of external AC (alternating-current) power, such as a household AC power supply (alternatively referred to herein as "AC mains" or "wall power").

The light(s) 1214 may include visual indicator(s) (e.g., light-emitting diodes (LEDs)) that emit light when activated by the device 1202. In some instances, the visual indicator(s) may include a light ring disposed on a portion of the device 1202. In other instances, the visual indicator(s) may be disposed on various portions on the device 1202.

As shown, the memory 1218 may store an operating system 1220 that controls one or more of the processes of the device 1202, as described herein. As further illustrated, the device 1202 may receive, using the network interface(s) 1206, control data 1222 representing commands to open and commands to close. When receiving the control data 1222 representing the command to open, a control component 1224 may cause a signal to be sent to actuator(s) 1226 that cause the actuator(s) 1226 to move a portion of the soundproof cover from a first position (e.g., a close position) to a second position (e.g., an open position). Additionally, when receiving the control data 1222 representing the command to close, the control component 1224 may cause a signal to be sent to the actuator(s) 1226 that cause the actuator(s) 1226 to move the portion of the soundproof cover from the second position to the first position.

As further illustrated, the device 1202 may generate, using the microphone(s) 1210, audio data 1228 representing user speech, where the user speech represents commands to open or commands to close. The device 1202 may then analyze the user speech to determine when the user speech represents the commands to open or the commands to close. When the user speech represents the command to open, the control component 1224 may cause a signal to be sent to the actuator(s) 1226 that cause the actuator(s) 1226 to move the portion of the soundproof cover from the first position to the second position. Additionally, when the user speech represents the command to close, the control component 1224 may cause a signal to be sent to the actuator(s) 1226 that cause the actuator(s) 1226 to move the portion of the soundproof cover from the second position to the first position.

The memory 1218 may further store time data 1230. The time data 1230 may indicates first time(s) at which the portion of the soundproof cover is to be open and second time(s) at which the portion of the soundproof cover is to be closed. During the first time(s), the control component 1224 may cause a signal to be sent to the actuator(s) 1226 that cause the actuator(s) 1226 to move the portion of the soundproof cover from the first position to the second position. Additionally, during the second time(s), the control component 1224 may cause a signal to be sent to the actuator(s) 1226 that cause the actuator(s) 1226 to move the portion of the soundproof cover from the second position to the first position. In instances where the device 1202 stores time data 1230, the device 1202 may receive, using the network interface(s) 1206, control data 1222 representing the first time(s) and/or the second time(s). For instance, the user may use another electronic device to update the first time(s) and/or the second time(s).

The memory 1218 may further store input data 1232. The input data 1232 may represents inputs received by the input device(s) 1212, where the inputs corresponds to commands to open the soundproof cover or commands to close the soundproof cover. When the input data 1232 represents the command to open, the control component 1224 may cause a signal to be sent to the actuator(s) 1226 that cause the actuator(s) 1226 to move the portion of the soundproof cover from the first position to the second position. Additionally, when the input data 1232 represents the command to close, the control component 1224 may cause a signal to be sent to the actuator(s) 1226 that cause the actuator(s) 1226 to move the portion of the soundproof cover from the second position to the first position.

As further illustrated in the example of FIG. 12, the device 1202 may receive, over a network 1234, data from a user device 1236. In some instances, the data may include the control data 1222. While the example of FIG. 12 illustrates the user device 1236 communication directly with the device 1202, in other examples, the user device 1236 may communicate with the device 1202 via one or more other devices. For example, the user device 1236 may send the control data 1222 to a remote system, which then sends the control data 1222 to the device 1202.

As used herein, a processor, such as the processor(s) 1204, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more systems.

Memory, such as the memory 1218, may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s), such as the network interface(s) 1206, may enable data to be sent between devices. For example, the network interface(s) 1206 may enable data to be sent between the device 1202 and one or more other electronic devices. For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Figure 13:
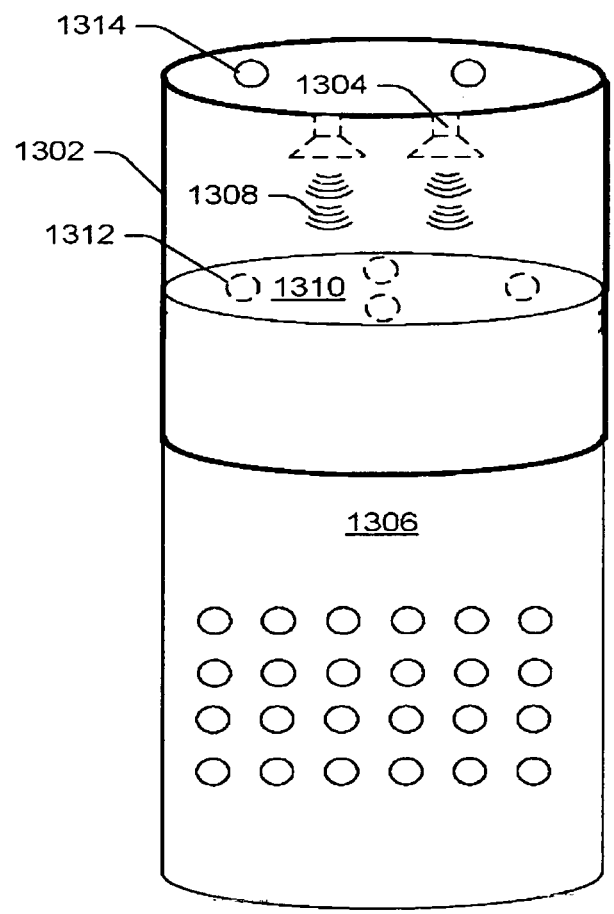
FIG. 13 illustrates a schematic diagram of an example soundproof cover that includes speakers(s) for blocking sound, according to various examples of the present disclosure.

FIG. 13 illustrates a schematic diagram of an example soundproof cover 1302 that includes speakers 1304 for blocking sound, according to various examples of the present disclosure. The soundproof cover 1302 may be placed on an electronic device 1306. The speakers 1304 of the soundproof cover 1302 may output sound 1308 towards a portion 1310 of the electronic device 1306, where the portion 1310 to the electronic device 1310 includes openings 1312 for allowing the outside sound to travel to the microphone(s) of the electronic device 1306. As such, the microphone(s) of the electronic device 1306 may capture the sound 1308 from the speakers 1304 rather than the outside sound.

In some instances, the device 1202 located in the cover 1302 (not illustrated for clarify reasons) may control the speaker(s) 1304 (which may represent, and/or include, the speaker(s) 1208). For example, the device 1202 may cause the speaker(s) 1304 to output the sound 1308 and/or cease from outputting the sound 1308. In some instances, the device 1208 may cause the speaker(s) 1304 to output the sound 1308 when receiving data (e.g., control data 1222) representing a command to block the outside sound and/or output the sound 1308, and the device 1208 may cause the speaker(s) 1304 to cease outputting the sound 1308 when receiving a command to not block the outside sound and/or cease outputting the sound 1308. In such instances, the device 1208 may receive the data using one or more techniques as described above with respect to the data representing the commands to open or the commands to close.

In some instances, the soundproof cover 1302 may include one or more openings 1314 for allowing the outside sound to travel to the microphone(s) of the electronic device 1308 when the speaker(s) 1304 are not outputting the sound 1308. However, in other examples, the soundproof cover 1302 may not include the one or more openings 1314. Additionally, in some instances, a portion of the soundproof cover 1302 may be configured to move between a first position and a second position, similar to the soundproof cover 502 illustrated in the example of FIGS. 5A-5B.

Figure 14:
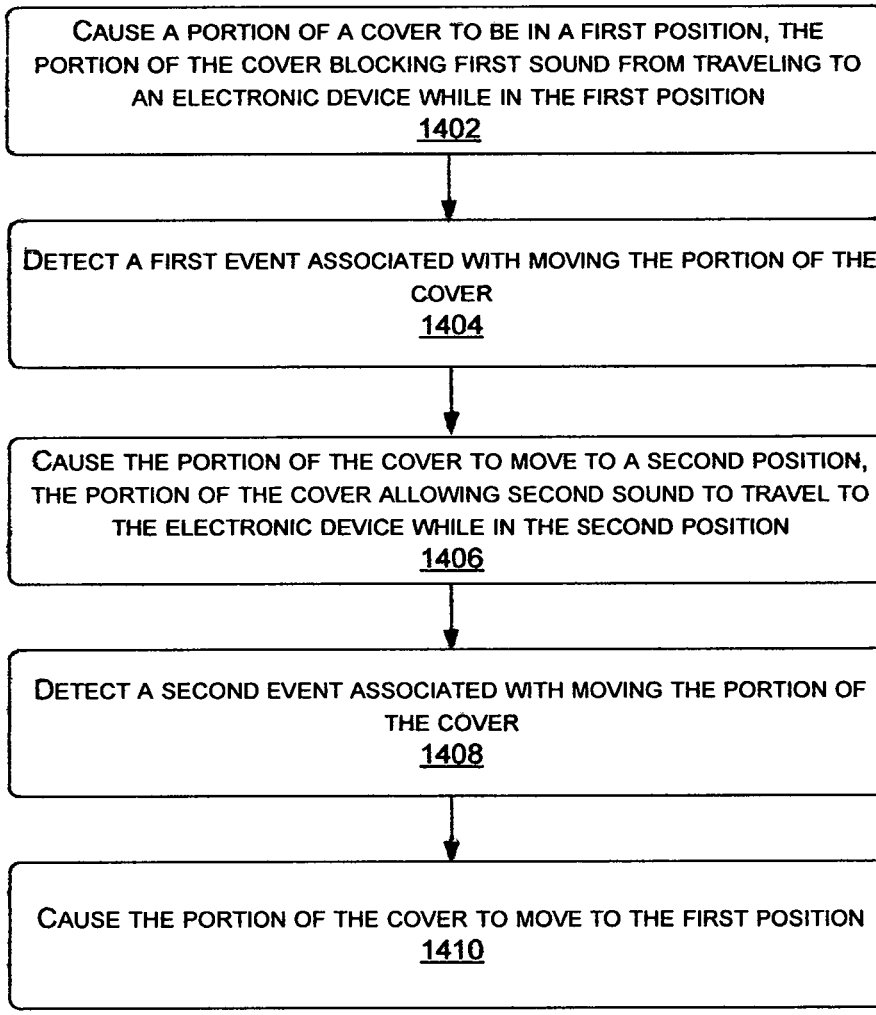
FIG. 14 is an example process of a device moving a soundproof surface between a first surface and a second surface, according to various examples of the present disclosure.

FIG. 14 is an example process 1400 of a device moving a soundproof surface between a first surface and a second surface, according to various examples of the present disclosure. The process 1400 described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

At 1402, the process 1400 may include causing a portion of a cover to be in a first position, the portion of the cover blocking first sound from traveling to an electronic device while in the first position. For instance, the device 1202 may cause the portion of the cover to be in the first portion. While in the first position, the portion of the cover may align with a portion of the electronic device that is configured to receive the first sound. For instance, the portion of the electronic device may include one or more openings for allowing the first sound to travel to the microphone(s) of the electronic device. The portion of the cover may include a soundproof material that blocks the first sound from traveling from one side of the portion of the cover to the other side of the portion of the cover.

At 1404, the process 1400 may include detecting a first event associated with moving the portion of the cover. For instance, the device 1202 may detect the first event. In some instance, detecting the first event may comprise the device 1202 generating, using microphone(s), audio data representing user speech, where the user speech includes a command to open the portion of the cover. In some instances, detecting the first event may comprise the device 1202 receiving, using an input device, a physical input representing a command to open the portion of the cover. Still, in some instances, detecting the first event may comprise the device 1202 determining that a current time is within first time(s) associated with opening the portion of the cover.

At 1406, the process 1400 may include causing the portion of the cover to move to a second position, the portion of the cover allowing second sound to travel to the electronic device while in the second position. For instance, based on detecting the first event, the device 1202 may cause the portion of the cover to move to the second position. Moving the portion of the cover to the second portion may include opening the portion of the cover.

At 1408, the process 1400 may include detecting a second event associated with moving the portion of the cover. For instance, the device 1202 may detect the second event. In some instance, detecting the second event may comprise the device 1202 generating, using the microphone(s), audio data representing user speech, where the user speech includes a command to close the portion of the cover. In some instances, detecting the second event may comprise the device 1202 receiving, using the input device, a physical input representing a command to close the portion of the cover. Still, in some instances, detecting the second event may comprise the device 1202 determining that a current time is within second time(s) associated with closing the portion of the cover.

At 1406, the process 1400 may include causing the portion of the cover to move to the first position. For instance, based on detecting the second event, the device 1202 may cause the portion of the cover to move to the first position. Moving the portion of the cover to the first position may include once again closing the portion of the cover.

Figure 15:
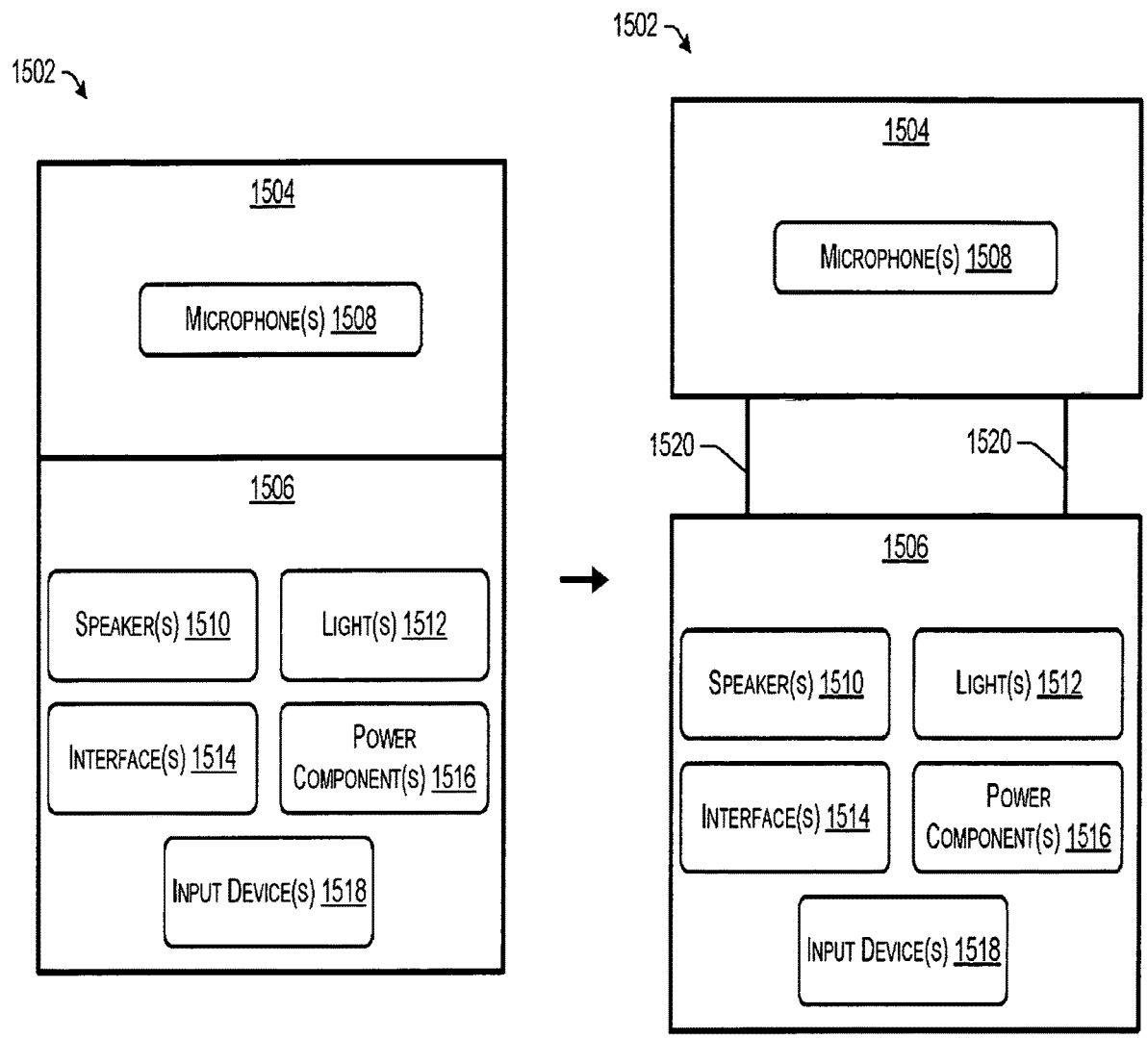
FIG. 15 illustrates a schematic diagram of an example electronic device that includes detachable microphone(s), according to various examples of the present disclosure.

FIG. 15 illustrates a schematic diagram of an example electronic device 1502 that includes detachable microphone(s), according to various examples of the present disclosure. For instance, the electronic device 1502 may include a first portion 1504 that is detachably coupled to a second portion 1506. As shown, the first portion 1504 includes microphone(s) 1508 and the second portion 1506 includes speaker(s) 1510, light(s) 1512, network interface(s) 1512, power component(s) 1514, and input device(s) 1516. In some examples, the first portion 1504 and/or the second portion 1506 may include one or more additional components. Additionally, in some examples, the second portion 1506 may not include one or more of the speaker(s) 1510, the light(s) 1512, the network interface(s) 1514, the power component(s) 1516, or the input device(s) 1518.

In the example of FIG. 15, while the first portion 1504 is attached to the second portion 1506, as illustrated in the left illustration of the electronic deice 1502, the microphone(s) 1508 may be activated (e.g., turned on) and monitoring for sound. For instance, while the first portion 1504 is attached to the second portion 1506, the microphone(s) 1508 may be receiving power from the power component(s) 1516, which cause the microphone(s) 1508 to activate. Additionally, one or more of the speaker(s) 1510, the light(s) 1512, the network interface(s) 1514, or the input device(s) 1518 may be activated.

However, while the first portion 1504 is separated to the second portion 1506, as illustrated in the right illustration of the electronic device 1502, the microphone(s) 1508 may no longer be activated (e.g., turned off). For instance, while the first portion 1504 is separated from the second portion 1506, the microphone(s) 1508 may not be receiving the power from the power component(s) 1516. Additionally, one or more of the speaker(s) 1510, the light(s) 1512, the network interface(s) 1514, or the input device(s) 1518 may be activated.

In the example of FIG. 15, the electronic device 1502 includes attachment mechanism 1520 that allow the first portion 1504 to separate from the second portion 1506. For instance, the attachment mechanisms 1520 may allow the first portion 1504 to "slide apart" from the second portion 1520. However, in other instances, other types of attachment mechanisms may be used to separate the first portion 1504 from the second portion 1506. Additionally, in some instances, the first portion 1504 may completely detach from the second portion 1506.

Figure 16:
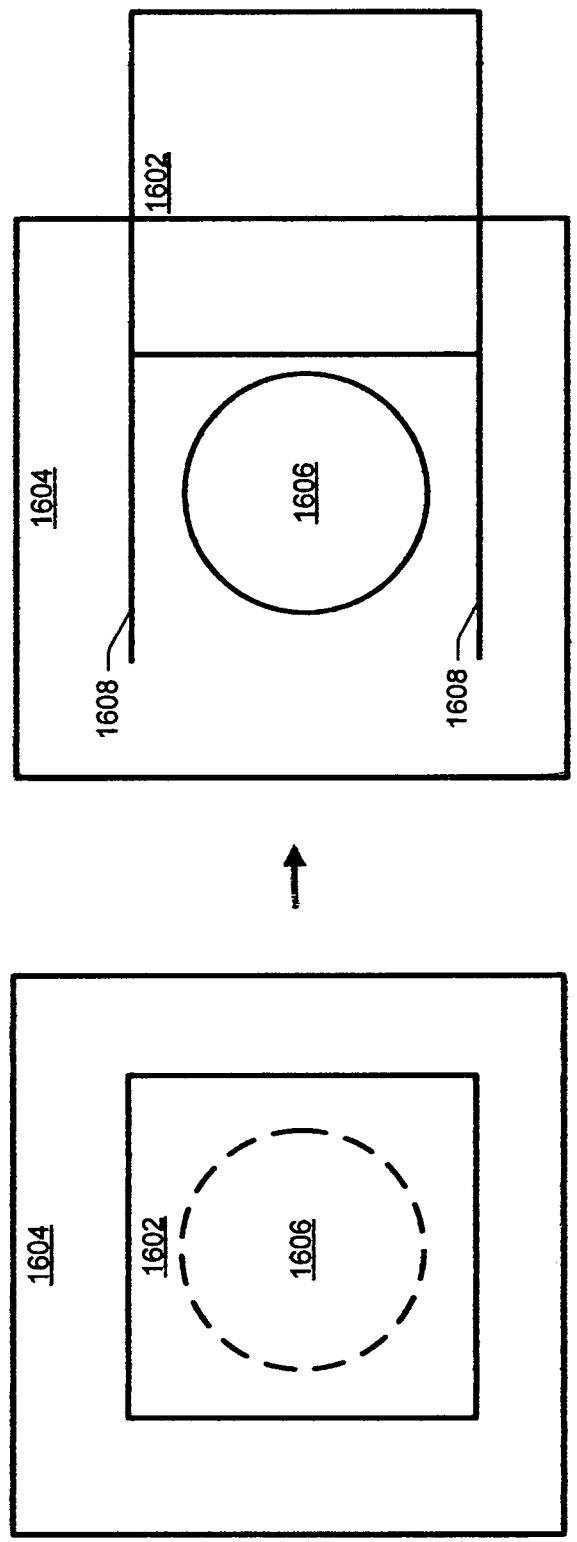
FIG. 16 illustrates a schematic diagram of a first example soundproof cover for microphone(s), according to various aspects of the present disclosure.

FIG. 16 illustrates a schematic diagram of a first example soundproof cover 1602 for microphone(s), according to various aspects of the present disclosure. For instance, a surface 1604 may include one or more openings 1606 for the microphone(s), which may be located behind the surface 1604. The soundproof cover 1602 may attach to the surface 1604 and cover the one or more openings 1606 when the soundproof cover 1602 is in a first position, as illustrated by the left illustration. As such, the microphone(s) may be unable to receive at least a portion of the sound that is within an environment that includes the surface 1604.

As illustrated in the right illustration, the soundproof cover 1602 may move to a second position. While in the second position, the one or more openings 1606 for the microphone(s) may be exposed such that the sound within the environment is able to travel to the microphone(s). In the example of FIG. 16, the soundproof cover 1602 includes attachment mechanisms 1608 that allow the soundproof cover 1602 to move between the first position and the second position. For example, the attachment mechanisms 1608 may allow the soundproof cover 1602 to "slide" between the first position and the second position. In some instances, a user manually changes the position of the soundproof cover 1602. In other examples, the soundproof cover 1602 may include a device (e.g., the device 1104) that causes the soundproof cover 1602 to change between the first position and the second position.

Figure 17:
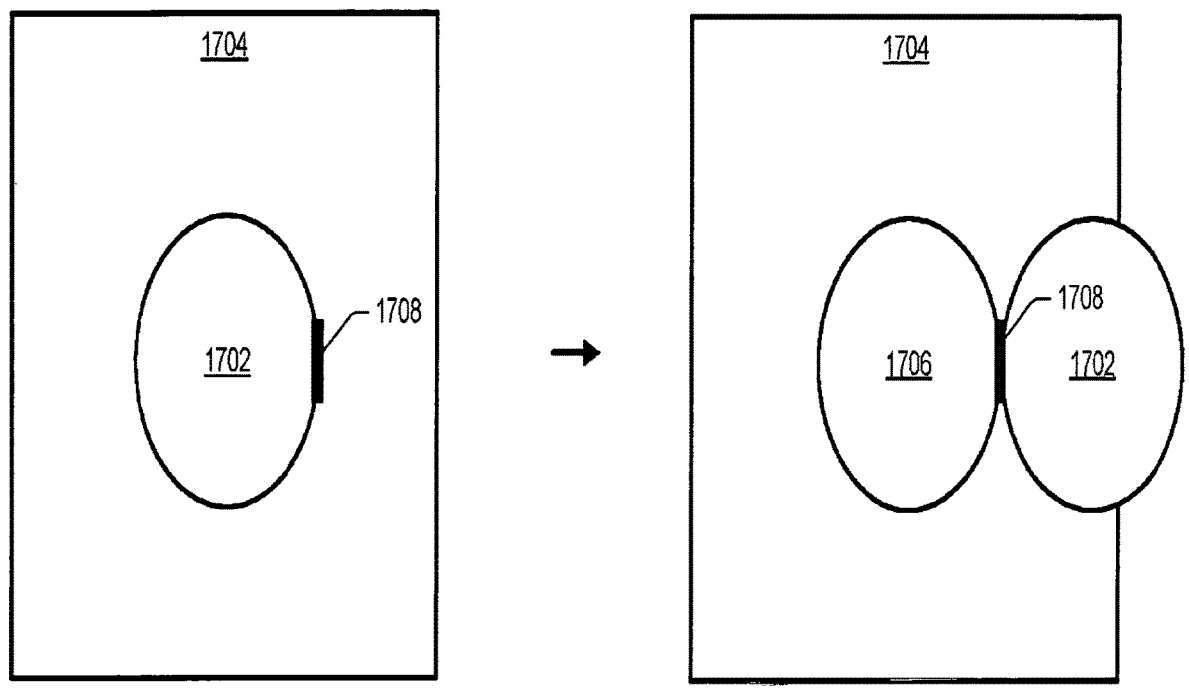
FIG. 17 illustrates a schematic diagram of a second example soundproof cover for microphone(s), according to various aspects of the present disclosure.

FIG. 17 illustrates a schematic diagram of a second example soundproof cover 1702 for microphone(s), according to various aspects of the present disclosure. For instance, a surface 1704 may include one or more openings 1706 for the microphone(s), which may be located behind the surface 1704. The soundproof cover 1702 may attach to the surface 1704 and cover the one or more openings 1706 when the soundproof cover 1702 is in a first position, as illustrated by the left illustration. As such, the microphone(s) may be unable to receive at least a portion of the sound that is within an environment that includes the surface 1704.

As illustrated in the right illustration, the soundproof cover 1702 may move to a second position. While in the second position, the one or more openings 1706 for the microphone(s) may be exposed such that the sound within the environment is able to travel to the microphone(s). In the example of FIG. 17, the soundproof cover 1702 includes attachment mechanisms 1708 that allow the soundproof cover 1702 to move between the first position and the second position. For example, the attachment mechanisms 1708 may allow the soundproof cover 1702 to "open and close" between the first position and the second position. In some instances, a user manually changes the position of the soundproof cover 1702. In other examples, the soundproof cover 1702 may include a device (e.g., the device 1104) that causes the soundproof cover 1702 to change between the first position and the second position.

Figure 18B:
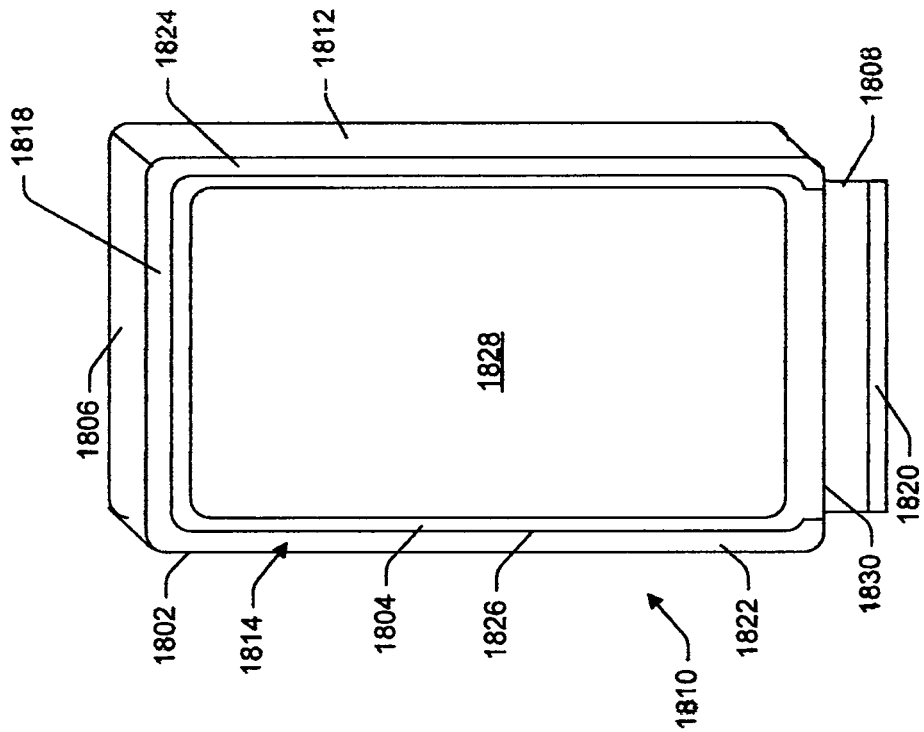
FIGS. 18A-18C illustrate schematic diagrams of a soundproof cover that may be placed on an electronic device, such as a mobile phone, according to various examples of the present disclosure.
Figure 18A:
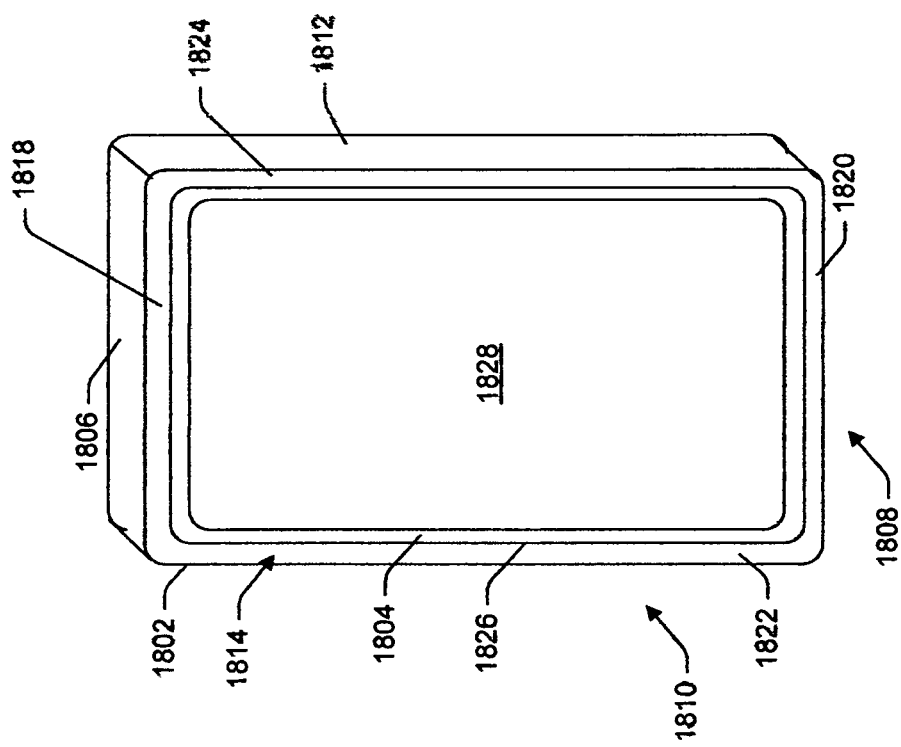
Figure 18C:
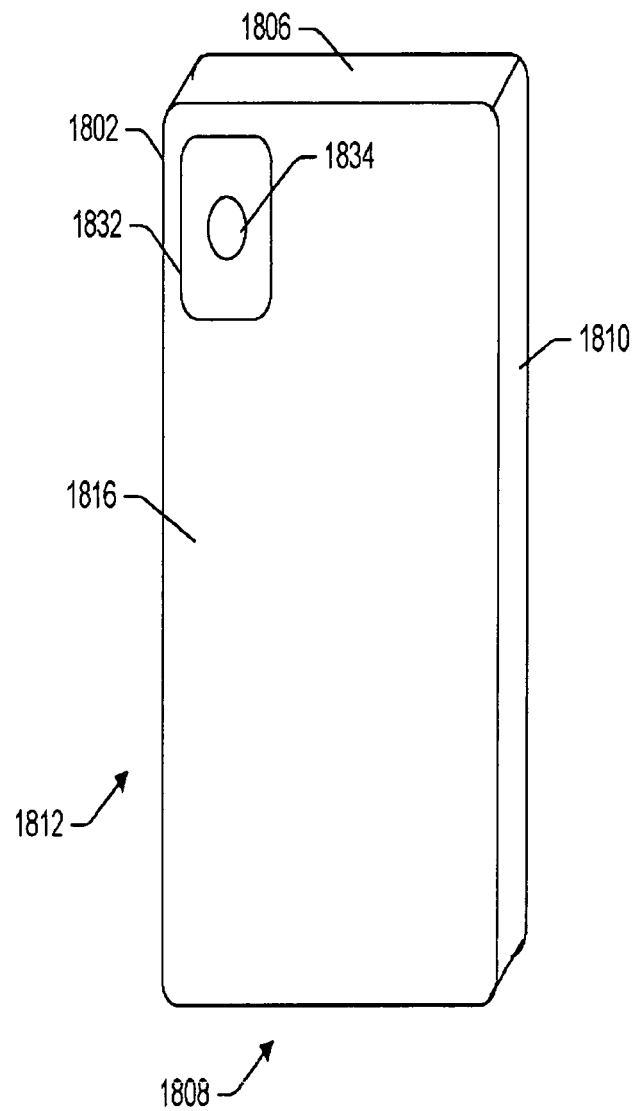

FIGS. 18A-18C illustrate schematic diagrams of a soundproof cover 1802 that may be placed on an electronic device 1804, such as a mobile phone, according to various examples of the present disclosure. As shown, the soundproof cover 1802 includes a first portion 1806 (e.g., top portion), a second portion 1808 (e.g., a bottom portion), a third portion 1810 (e.g., a left portion), a fourth portion 1812 (e.g., a right portion), a fifth portion 1814 (e.g., a front portion), and a sixth portion 1816 (e.g., a back portion).

In some instances, the first portion 1806 is configured to be disposed over a first portion (e.g., top portion) of the electronic device 1804, the second portion 1808 is configured to be disposed over a second portion (e.g., a bottom portion) of the electronic device 1804, the third portion 1810 is configured to be disposed over a third portion (e.g., a left portion) of the electronic device 1804, the fourth portion 1812 is configured to be disposed over a fourth portion (e.g., a right portion) of the electronic device 1804, the fifth portion 1814 if configured to be disposed over a fifth portion (e.g., a front portion) of the electronic device 1804, and the sixth portion 1816 is configured to be disposed over a sixth portion (e.g., a back portion) of the electronic device 1802.

The fifth portion 1814 of the soundproof cover 1802 may include a top edge 1818, a bottom edge 1820, a left edge 1822, and a right edge 1824. The top edge 1818, the bottom edge 1820, the left edge 1822, and the right edge 1824 may define the edges of an opening 1826 that allows a display 1828 of the electronic device 1804 to be visible. In some instances, the opening 1826 may further allow one or more other components of the electronic device 1804 to operate as intended. For instance, the opening 1826 may allow a camera of the electronic device 1804 to capture images and/or speaker(s) of the electronic device 1804 to output sound.

As illustrated in FIGS. 18A-18C, at least a portion of the second portion 1808 (e.g., a moveable portion) of the soundproof cover 1802 is able to move between a first position, which is illustrated in FIG. 18A, and a second position, which is illustrated in FIG. 18B. When in the first position, the moveable portion of the second portion 1808 may be disposed over and/or cover a portion 1830 of the electronic device 1804 that is associated with receiving sound. For instance, the portion 1830 of the electronic device 1804 may include one or more openings that allow sound to travel to microphone(s) of the electronic device 1804. Additionally, when in the second position, the moveable portion of the second portion 1808 may no longer be disposed over (e.g., disposed next to and/or adjacent to) the portion 1830 of the electronic device 1804. As such, the portion 1830 of the electronic device 1804 may no longer be covered and as such, the microphone(s) of the electronic device 1802 may be able to receive the sound. In some instances, at least some of the second portion 1808 may include a soundproofing material.

Although the example of FIGS. 18A-18C illustrates the portion 1830 as being located on the bottom of the electronic device 1804, in other examples, the portion 1830 of the electronic device 1804 may be located on one or more other portions of the electronic device 1804. In such instances, the moveable portion of the soundproof cover 1802 may be located on a different portion of the soundproof cover 1802 that is configured to still cover the portion 1830.

As illustrated in the example of FIG. 18C, the sixth portion 1816 of the soundproof cover 1802 includes an opening 1832 that allows one or more components of the electronic device 1804 to operate as intended. For instance, the opening 1832 may allow at least one camera 1834 of the electronic device 1804 to be visible so that the at least one camera 1834 is able to capture images.

Figure 19A:
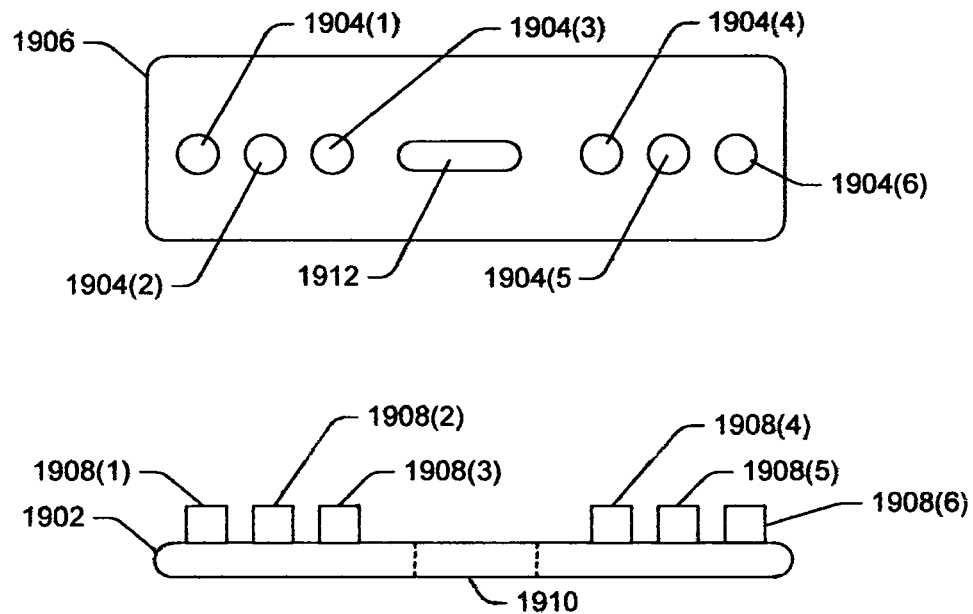
FIG. 19A illustrates a schematic diagram of a first example portion of a soundproof cover that may cover openings of an electronic device, according to various examples of the present disclosure.

FIG. 19A illustrates a schematic diagram of a first example portion (e.g., moveable portion) of a soundproof cover 1902 that may cover openings 1904(1)-(6) (also referred to as "openings 1904") of an electronic device 1906, according to various examples of the present disclosure. In the example of FIG. 19A, the openings 1904 may be associated with receiving sound. For instance, sound may navigate through the openings 1904 to microphone(s) of the electronic device 1906. As such, blocking the openings 1904 may block at least a portion of the sound from navigating to the microphone(s) of the electronic device 1906. In some instances, the portion of the electronic device 1906 from the example of FIG. 19A may include the portion 1830 of the electronic device 1804 from the example of FIGS. 18A-18C. Additionally, or alternatively, the portion of the soundproof cover 1902 from the example of FIG. 19A may include the at least the portion of the second portion 1808 of the soundproof cover 1802 from the example of FIGS. 18A-18C.

As shown, the portion of the soundproof cover 1902 may include plugs 1908(1)-(6) (also referred to as "plugs 1908") that insert into the openings 1904 when the portion of the soundproof cover 1902 is in a position that disposes the portion of the soundproof cover 1902 over the electronic device 1906. For instance, the plug 1908(1) may insert into the opening 1904(1), the plug 1908(2) may insert into the opening 1904(2), the plug 1908(3) may insert into the opening 1904(3), the plug 1908(4) may insert into the opening 1904(4), the plug 1908(5) may insert into the opening 1904(5), and the plug 1908(6) may insert into the opening 1904(6). In some instances, the plugs 1908 may include set dimensions that design the plugs 1908 to be disposed within the openings 1904. In other instances, the plugs 1908 may form when the soundproof cover 1902 is disposed over the electronic device 1906.

In some instances, the portion of the soundproof cover 1902 may include an opening 1910 that allows a peripheral input 1912 of the electronic device 1906 to be visible when the portion of the soundproof cover 1902 is in a first portion and/or a second position. For instance, the peripheral input 1912 may be associated with charging a battery of the electronic device 1906. As such, the opening 1910 may allow charging of the electronic device 1906 when the portion of the soundproof cover 1902 is in the first portion and/or the second position.

Figure 19B:
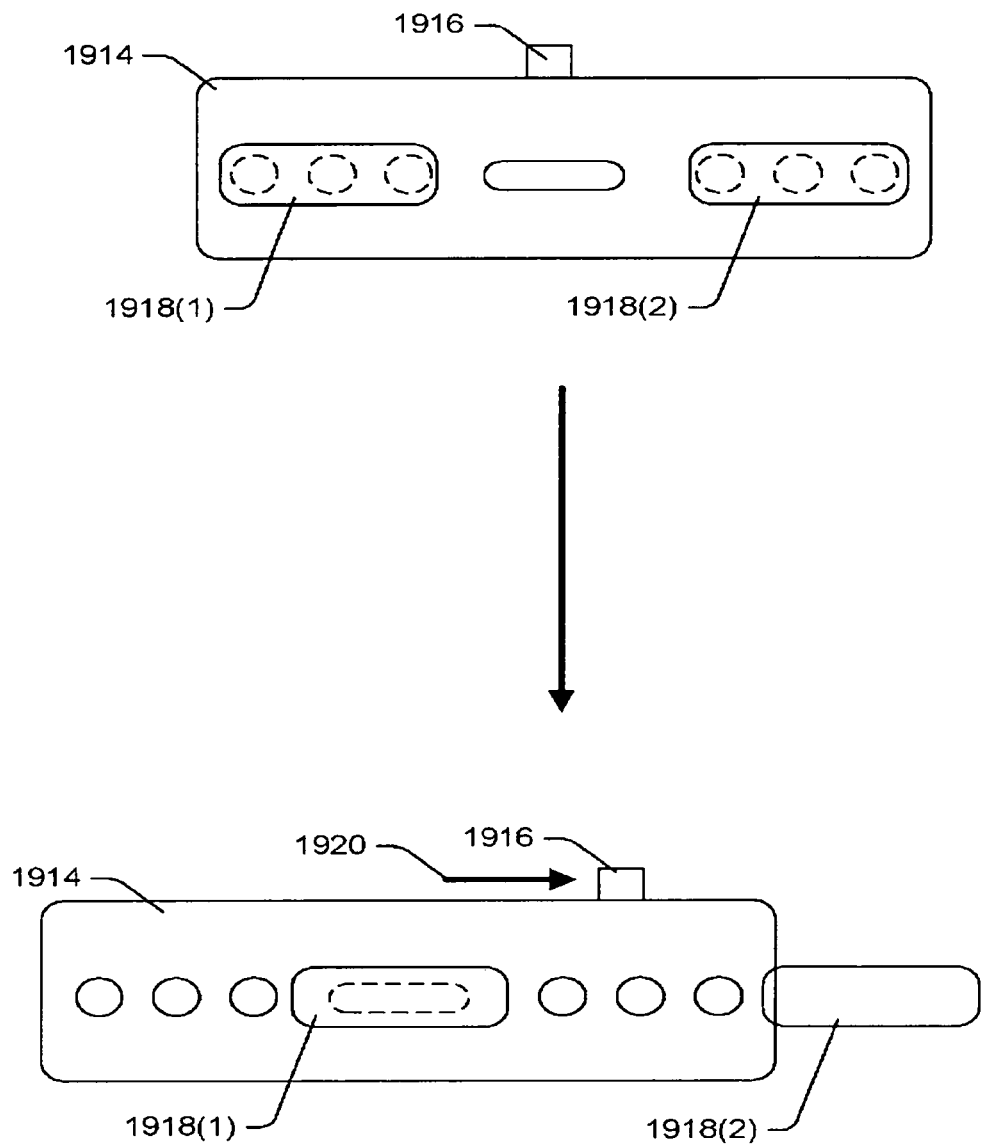
FIG. 19B illustrates a schematic diagram of a second example portion of a soundproof cover that may cover openings of an electronic device, according to various examples of the present disclosure.

FIG. 19B illustrates a schematic diagram of a second example portion of a soundproof cover 1914 (e.g., a moveable portion) that may cover the openings 1904 of the electronic device 1906, according to various examples of the present disclosure. In the example of FIG. 19B, the soundproof cover 1914 includes a slider (e.g., a moveable portion) that comprises at least a mechanism 1916 and covers 1918

(1)-(2) (also referred to as "covers 1918"). When the slider is in the first position, which is illustrated by the top image, the covers 1918 may be located over the openings 1904 of the electronic device 1906. Additionally, when the slider is in the second position, which is illustrated by the bottom image, the covers 1918 may not be located over (e.g., located adjacent to) the openings 1904 of the electronic device 1906.

In the example of FIG. 19B, the slider is able to move from the first position to the second position by moving the mechanism 1916, which is illustrated by an arrow 1920. For example, when the mechanism 1916 is moved to the second position, one or more components of the soundproof cover 1914 may cause the covers 1918 to move between the first position and the second position.

Figure 20A:
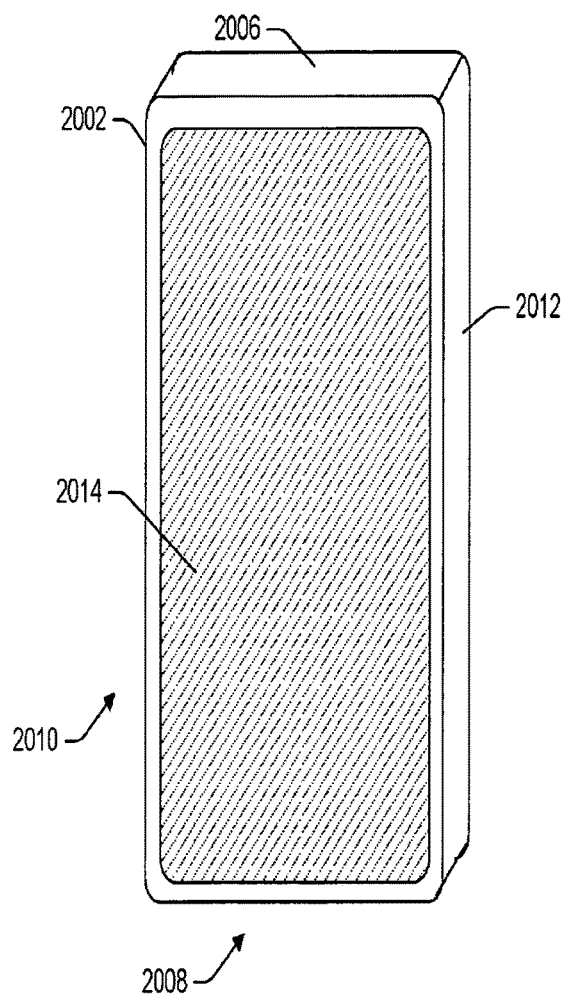
FIGS. 20A-20C illustrates a schematic diagram of a soundproof cover that may be placed on an electronic device that uses vibrations for receiving sound, according to various examples of the present disclosure.
Figure 20B:
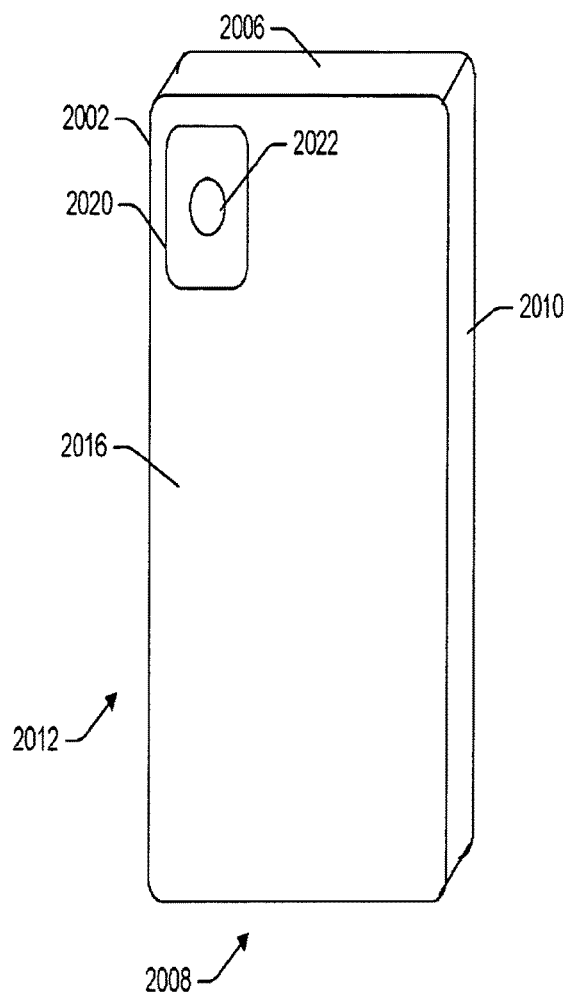
Figure 20C:
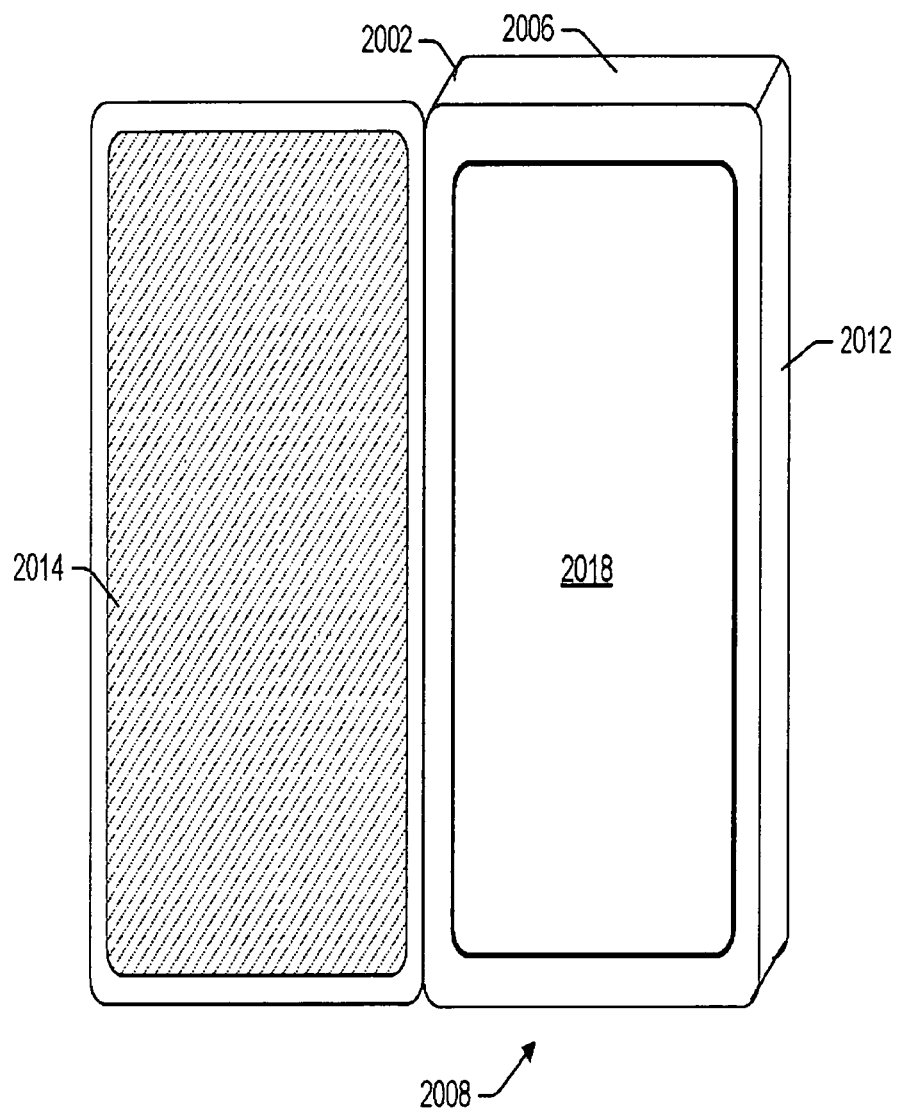

FIGS. 20A-20C illustrates a schematic diagram of a soundproof cover 2002 that may be placed on an electronic device 2004 that uses vibrations for receiving sound, according to various examples of the present disclosure. As shown, the soundproof cover 2002 includes a first portion 2006 (e.g., top portion), a second portion 2008 (e.g., a bottom portion), a third portion 2010 (e.g., a left portion), a fourth portion 2012 (e.g., a right portion), a fifth portion 2014 (e.g., a front portion), and a sixth portion 2016 (e.g., a back portion).

In some instances, the first portion 2006 is configured to be disposed over a first portion (e.g., top portion) of the electronic device 2004, the second portion 2008 is configured to be disposed over a second portion (e.g., a bottom portion) of the electronic device 2004, the third portion 2010 is configured to be disposed over a third portion (e.g., a left portion) of the electronic device 2004, the fourth portion 2012 is configured to be disposed over a fourth portion (e.g., a right portion) of the electronic device 2004, the fifth portion 1814 if configured to be disposed over a fifth portion (e.g., a front portion) of the electronic device 1804, and the sixth portion 2016 is configured to be disposed over a sixth portion (e.g., a back portion) of the electronic device 2004.

In some instances, the electronic device 2004 may receive sound based on vibrations of one or more portions of the electronic device 2004. For example, sound (e.g., soundwaves) may cause a display 2018 of the electronic device 2004 to vibrate, where the electronic device 2004 uses the vibration in order to generate audio data representing the sound. As such, the fifth portion 2014 of the soundproof cover 2002 may block at least a portion of the sound from reaching the display 2018 of the electronic device 2004 such that display 2018 does not vibrate and/or the electronic device 2004 is unable to generate the audio data representing the sound.

In some instances, the fifth portion 2014 of the soundproof cover 2002 may also be transparent such that the display 2018 of the electronic device 2004 is visible. For example, and as illustrated in FIGS. 20A and 20C, the fifth portion 2014 of the soundproof cover 2002 is able to move between a first position, which is illustrated in FIG. 20A, and a second position, which is illustrated in FIG. 20C. When in the first position, the fifth portion 2014 may be disposed over and/or cover the display 2018 of the electronic device 2004. Additionally, when in the second position, the fifth portion 2014 may not be disposed over (e.g., disposed next to and/or adjacent to) the display 2018 of the electronic device 2004. As such, the display 2018 of the electronic device 2004 may no longer be covered such that the display 2018 may once again vibrate based on sound hitting the display 2018.

Although the above examples describe the electronic device 2004 as generating audio data based on the vibrations of the display 2018, in other examples, the electronic device 2004 may generate audio data based on other portions of the electronic device 2004 vibrating from sound (e.g., soundwaves). In such examples, other portion(s) of the soundproof cove 2002 may block at least a portion of the sound from reaching the portion(s) of the electronic device 2004 such that the electronic device 2004 is not able to generate the audio data representing the sound. Additionally, the other portion(s) of the soundproof cover 2002 may also be configured to move between first portion(s) and second positions(s), where the position(s) of the soundproof cover 2002 allow the sound to reach the portion(s) of the electronic device 2004 when in the first position(s) and block at least a portion of the sound from reaching the portion(s) of the electronic device 2004 when in the second position(s).

As illustrated in the example of FIG. 20B, the sixth portion 2016 of the soundproof cover 2002 includes an opening 2020 that allows one or more components of the electronic device 2004 to operate as intended. For instance, the opening 2020 may allow at least one camera 2022 of the electronic device 2004 to be visible so that the at least one camera 2022 is able to capture images.

Although the example of FIGS. 20A-20C illustrate the fifth portion 2014 of the soundproof cover 2002 as including a cover for the display 2018, in other examples, the fifth portion 2014 of the soundproof cover 2004 may include a component (e.g., a notch, a . . . , etc.) that stops the display 2018 from vibrating while in the first position and does not stop the display 2018 from vibrating while in the second position.

Figure 21:
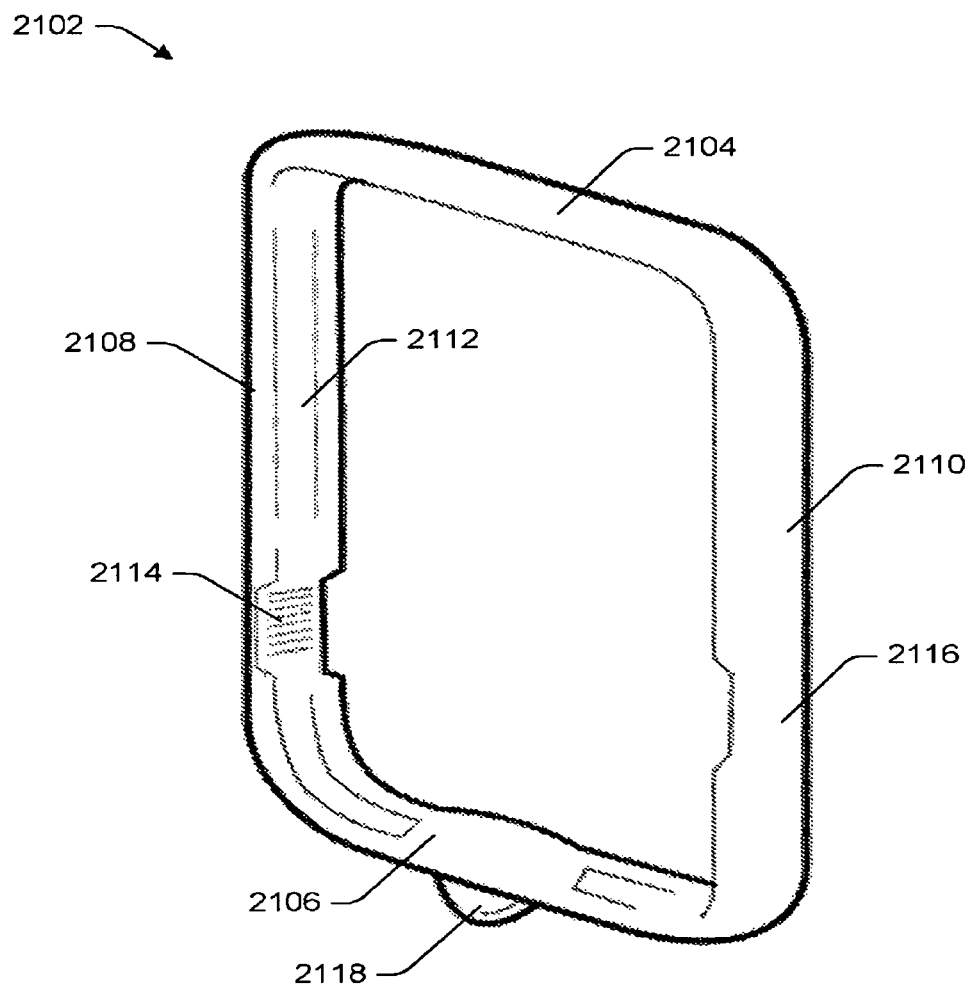
FIG. 21 illustrates a schematic diagram of a soundproof cover that may be placed on an electronic device, according to various examples of the present disclosure.

In the examples of FIGS. 18A-20C, a "moveable portion" may include the portion of the soundproof cover that moves between multiple positions. For instance, the moveable portion in the example of FIGS. 18A-18C may include all of the second portion 1808, such as when the second portion 1808 moves between different portions, and/or only a portion of the second portion 1808 that moves between different positions. Additionally, in the example of FIG. 19B, the moveable portion may include the mechanism 1916 and/or the covers 1918. Furthermore, in the example of FIGS. 20A-20C, the moveable portion may include all of the fifth portion 2014, such as when the fifth portion 2014 moves between different portions, and/or only a portion of the fifth portion 2014 that moves between different positions FIG. 21 illustrates a schematic diagram of a soundproof cover 2102 that may be placed on an electronic device, according to various examples of the present disclosure. As shown, the soundproof cover 2104 may include a first portion 2104 (e.g., top portion), a second portion 2106 (e.g., bottom portion), a third portion 2108 (e.g., a left portion), and a fourth portion 2110 (e.g., a right portion). The portions 2104-2110 of the soundproof cover 2102 may define the boundary of the soundproof cover 2102 that wraps around the outer edges of the electronic device. By wrapping around the outer edges of the electronic device, the soundproof cover 2102 may be secured to the electronic device.

For example, the first portion 2104 is configured to be disposed over a first portion (e.g., top edge) of the electronic device, the second portion 2106 is configured to be disposed over a second portion (e.g., a bottom edge) of the electronic device, the third portion 2108 is configured to be disposed over a third portion (e.g., a left edge) of the electronic device, and the fourth portion 2110 is configured to be disposed over a fourth portion (e.g., a right edge) of the electronic device. In some instances, and as shown in the example of FIG. 21, at least portion(s) of the portions 2104-2110 of the soundproof cover 2102 may include grooves 2112 (although only one is labeled for clarify reasons) such that the portions 2104-2110 of the soundproof cover 2102 are able to wrap around the outer edges of the electronic device. This way, the soundproof cover 2102 is able to securely attach to the electronic device.

In some instances, the soundproof cover 2102 may further include a first stretchable portion 2114 on the third portion 2108 and a second stretchable portion 2116 on the fourth portion 2110. The first stretchable portion 2114 and the second stretchable portion 2116 are configured to stretch such that the soundproof cover 2102 is able to attach to different electronic devices that include different dimensions. In some instances, the soundproof cover 2102 may be configured to attach to different types of electronic devices. In some instance, the soundproof cover 2102 may further include a stretchable portion on the first portion 2104 and/or stretchable portion on the bottom portion 2106.

In some instances, the soundproof cover 2102 may include a mechanism 2118 that is used when attaching the soundproof cover 2102 to the electronic device and/or removing the soundproof cover 2102 from the electronic device. In some instances, the second portion 2106 of the soundproof cover 2102 may include a soundproof material, one or more plugs, and/or a slider for blocking the sound from reaching the electronic device.

Figure 22:
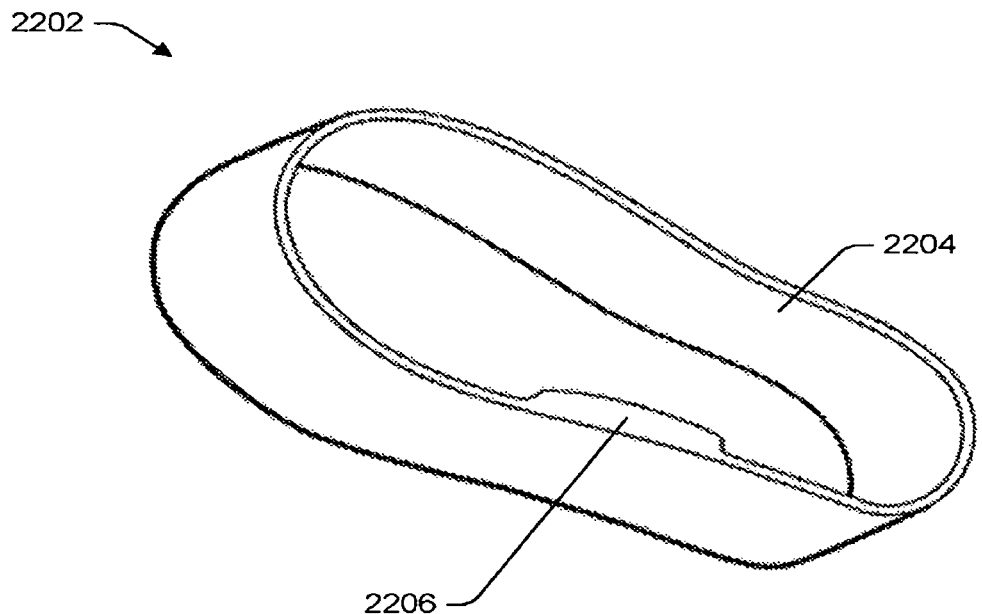
FIG. 22 illustrates a schematic diagram of a first soundproof cover that includes an elongated portion, according to various examples of the present disclosure.

FIG. 22 illustrates a schematic diagram of a first soundproof cover 2202 that includes an elongated portion, according to various examples of the present disclosure. As shown, the soundproof cover 2202 includes an elongated portion 2204 (e.g., elongated band) that is configured to distort and/or stretch in order to wrap around the outer edges of an electronic device. By including the elongated portion, the soundproof cover 2202 is configured to attach to different types of electronic devices that include different dimensions. The soundproof cover 2202 further includes an enlarged portion 2206 (e.g., thicker, wider, etc.) that is configured to be disposed over a portion of the electronic device that is for receiving sound when the soundproof cover 2202 is attached to the electronic device. In some instances, the enlarged portion 2206 of the soundproof cover 2202 may include a soundproof material, one or more plugs, and/or a slider for blocking the sound from reaching the electronic device.

In some instances, at least a portion of the soundproof cover 2202 may include silicon, rubber, plastic, and/or some other type of material. As discussed above, the material may allow the soundproof cover 2202 may allow the soundproof cover 2202 to stretch in order to attach around the outer edges of the electronic device.

Figure 23:
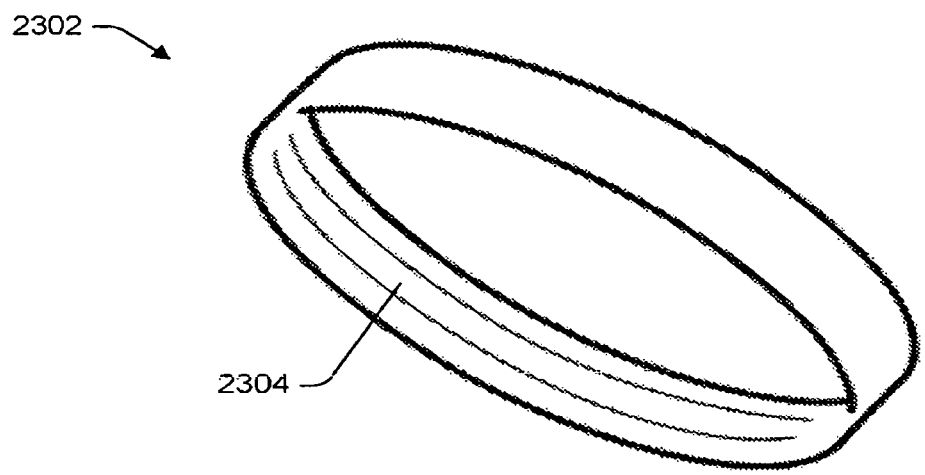
FIG. 23 illustrates a schematic diagram of a second soundproof cover that includes an elongated portion, according to various examples of the present disclosure.

FIG. 23 illustrates a schematic diagram of a second soundproof cover 2302 that includes an elongated portion, according to various examples of the present disclosure. As shown, the soundproof cover 2302 includes an elongated band that is configured to distort and/o stretch in order to wrap around the outer edges of an electronic device. Additionally, the soundproof cover 2302 includes a groove 2304 located along at least a portion of the elongated band. The groove 2304 may help allow the soundproof cover 2302 better attach to the electronic device. For instance, because of the grove 2304, the soundproof cover 2302 may at least partially wrap around the top, bottom, left, and right edges of the of the electronic device.

In some instances, a soundproof cover may include multiple elongated bands, where each sis similar to the elongated band of the soundproof cover 2302. In such instances, one or more of the elongated bands may have grooves for better attaching the one or more elongated bands to the electronic device. In some instances, a first elongated band may wrap around a portion of the electronic device that is configured to receive sound and a second elongated band may be configured to wrap around a portion of the electronic device that is associated with an output device of the electronic device. For instance, the first elongated band may wrap around the portion of the electronic device that includes openings for the microphone(s). Additionally, the second elongated band may wrap around the camera of the electronic device.

Figure 24:
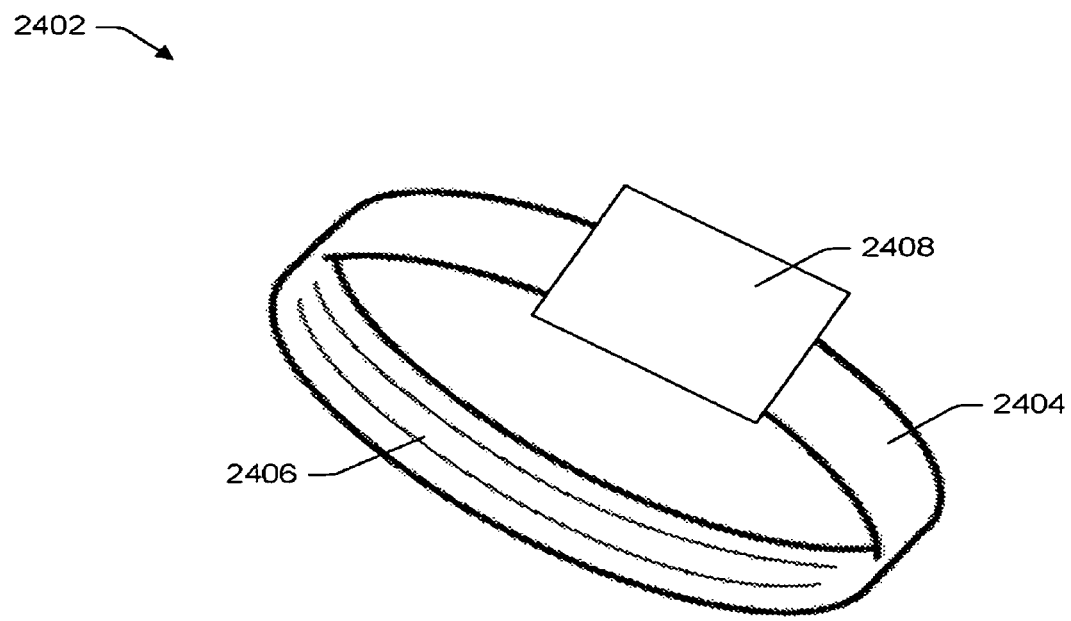
FIG. 24 illustrates a schematic diagram of a third soundproof cover that includes an elongated portion, according to various examples of the present disclosure.

FIG. 24 illustrates a schematic diagram of a third soundproof cover 2402 that includes an elongated portion, according to various examples of the present disclosure. In some instances, the soundproof cover 2402 may be similar to the soundproof cover 2302. For instance, the soundproof cover 2402 may include an elongated band 2404 with grooves 2406. However, in the example of FIG. 24, the soundproof cover 2402 may include an enlarged portion 2408 (e.g., thicker, wider, etc.). The enlarged portion 2408 may be configured to be disposed over a portion of the electronic device that is configured for receiving sound. As such, the enlarged portion 2408 of the soundproof cover 2402 may wrap around the portion of the electronic device in order to block at least a portion of the sound from reaching the portion of the electronic device.

Figure 25:
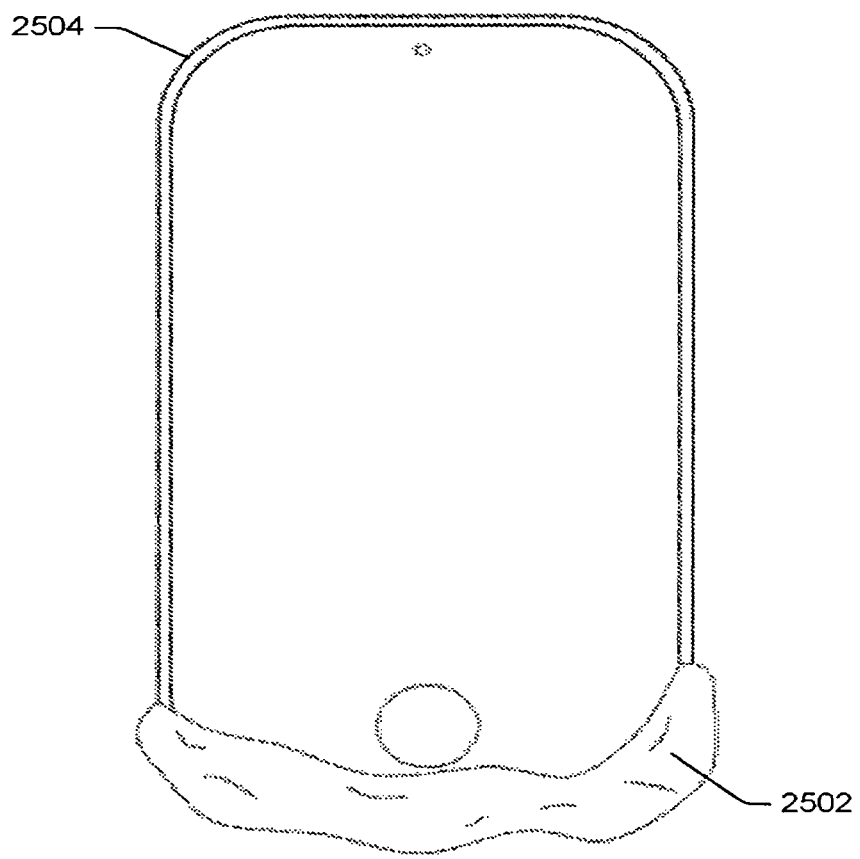
FIG. 25 illustrates a schematic diagram of a soundproof cover that is configured to attach to a portion of an electronic device, according to various examples of the present disclosure.

FIG. 25 illustrates a schematic diagram of a soundproof cover 2502 that is configured to attach to a portion of an electronic device 2504, according to various examples of the present disclosure. As shown, the soundproof cover 2502 may attach to a portion of the electronic device 2504 that is configured to received sound. For instance, the portion of the electronic device 2504 may include openings for receiving sound that is captured by the microphone(s) of the electronic device 2504.

In the example of FIG. 26, at least a portion of the soundproof cover 2602 may include a material that is capable of molding to the electronic device 2604. For instance, the portion of the soundproof cover 2602 may include putty, rubber, silicon, and/or any other material that is configured to mold to the electronic device 2604. This way, the soundproof cover 2602 is capable to securely attaching to the electronic device 2604. Additionally, in some instances, portions of the soundproof cover 2602 are capable of molding into the openings of the electronic device 2604 that are associated with receiving the sound.

While the foregoing invention is described with respect to the specific examples, it is to be understood that the scope of the invention is not limited to these specific examples. Since other modifications and changes varied to fit particular requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

Example Clauses

A: A soundproof cover for a voice-controlled device, the soundproof cover comprising: a soundproof material located at a first portion of the soundproof cover, the soundproof material to block first sound from traveling through the first portion of the soundproof cover; a moveable mechanism to allow the first portion of the soundproof cover to move from a first position to a second position; an opening located at a second portion of the soundproof cover, the opening to allow second sound to travel from within the voice-controlled device to outside of the voice-controlled device; and an attachment mechanism to secure the soundproof cover to the voice-controlled device.

B: The soundproof cover as recited in paragraph A, further comprising an additional opening located at a third portion of the soundproof cover, the additional opening to allow a display of the voice-controlled device to be visible.

C: The soundproof cover as recited in paragraph B, wherein: while the first portion of the soundproof cover is in the first position, the first portion of the soundproof cover is configured to block the first sound from traveling from outside of the voice-controlled device to within the voice-controlled device; and while the first portion of the soundproof cover is in the second position, the first sound is able to travel from outside of the voice-controlled device to inside of the voice-controlled device.

D: The soundproof cover as recited in any one of paragraphs A-C, further comprising an additional opening located at a third portion of the soundproof cover, the additional opening to allow light emitted by the voice-controlled device to travel outside of the soundproof cover.

E: A cover comprising: a soundproof material located at a first portion of the cover, the first portion of the cover to align with a first portion of an electronic device that is associated with receiving first sound; and one or more openings located at a second portion of the cover, the second portion of the cover to align with a second portion of the electronic device that is associated with outputting second sound.

F: The cover as recited in paragraph E, further comprising an attachment mechanism to secure the cover to the electronic device.

G: The cover as recited in either paragraph E or paragraph F, further comprising one or more additional openings located at a third portion of the cover, the third portion of the cover to align with a display of the electronic device.

H: The cover as recited in any one of paragraphs E-G, further comprising a moveable mechanism operable to move the first portion of the cover from a first position to a second position.

I: The cover as recited in paragraph H, wherein: while in the first position, the first portion of the cover is configured to block at least a portion of the first sound from traveling to one or more microphones of the electronic device; and while in the second position, the first portion of the cover is configured to allow the first sound to travel to the one or more microphones of the electronic device.

J: The cover as recited in paragraph H, further comprising: an input device; one or more processors; and one or more computer-readable storing instructions that, when executed by the one or more processors, cause the one or more processors to perform operations comprising: receiving a first input using the input device; based at least in part on the first input, causing the moveable mechanism to move the first portion of the cover to the second position; receiving a second input using the input device; and based at least in part on the second input, causing the moveable mechanism to move the portion of the cover to the first position.

K: The cover as recited in paragraph H, further comprising an attachment mechanism to secure the first portion of the cover to a third portion of the cover when the first portion of the cover is in the first position.

L: The cover as recited in any one of paragraphs E-K, further comprising one or more additional openings located at a third portion of the cover, the third portion of the cover to align with one or more light emitters of the electronic device.

M: The cover as recited in any one of paragraphs E-L, further comprising one or more additional openings, the one or more additional openings to align with one or more peripheral inputs of the electronic device.

N: A cover comprising: a surface, the surface to align with a portion of an electronic device that is associated with receiving sound; and a material located on at least a portion of the surface, the material to block at least a portion of the sound from traveling to the electronic device; and a mechanism operable to move the surface from a first position to a second position.

O: The cover as recited in paragraph N, further comprising: an additional surface, the additional surface to align with an additional portion of the electronic device that is associated with outputting additional sound; and one or more openings located on at least a portion of the additional surface.

P: The cover as recited in either paragraph N or paragraph O, further comprising: an additional surface, the additional surface to align with an additional portion of the electronic device that is associated with outputting additional sound; and an additional material located on at least a portion of the additional surface, the additional material to allow the additional sound to travel outside of the cover.

Q: The cover as recited in any one of paragraphs N-P, further comprising: an additional surface, the additional surface to align with a display of the electronic device; and an opening located on at least a portion of the additional surface.

R: The cover as recited in any one of paragraphs N-Q, wherein: while the surface is in the first position, the surface aligns with the portion of the electronic device associated with receiving the sound; and while the surface is in the second position, the surface does not align with the portion of the electronic device associated with receiving the sound.

S: The cover as recited in any one of paragraphs N-R, wherein: while the surface is in the first position, the surface is configured to block at least the portion of the sound from traveling to the electronic device; and while the surface is in the second position, the surface configured to allow the sound to travel to the electronic device T: The cover as recited in any one of paragraphs N-S, further comprising at least one opening, the at least one opening to align with one or more light emitters of the electronic device.

U: A cover comprising: a top portion; a bottom portion, a moveable portion of the bottom portion configured to move between a first position and a second position; a left portion; a right portion; and a front portion, the first portion including at least a top edge, a bottom edge, a left edge, and a right edge that define an opening of the front portion.

V: The cover as recited in paragraph U, further comprising a moveable mechanism that allows the moveable portion to move between the first position and the second position.

W: The cover as recited in either of paragraphs U or V, further comprising a soundproof material located on at least a portion of the moveable portion.

X: The cover as recited in any one of paragraphs U-W, wherein the moveable portion includes at least one of a slider or plugs.

Y: The cover as recited in any one of paragraphs U-X, further comprising a back portion.

Z: The cover as recited in any one of paragraphs U-Y, wherein the moveable portion is configured to be disposed over a portion of an electronic device that is associated with receiving sound.

AA: The cover as recited in any one of paragraphs U-Z, wherein the top portion, the bottom portion, the left portion, and the right portion are configured to wrap around edges of an electronic device.

AB: A cover comprising: a first portion; a second portion, a moveable portion of the second portion configured to move between a first position and a second position; a third portion located between the first portion and the second portion; and a fourth portion located between the first portion and the second portion.

AC: The cover as recited in paragraphs AB, further comprising an opening located between the first portion, the second portion, the third portion, and the fourth portion.

AD: The cover as recited in either of paragraphs AB or AC, further comprising a fifth portion, the fifth portion including at least a first edge, a second edge, a third edge, and a fourth edge that define an opening of the fifth portion.

AE: The cover as recited in any one of paragraphs AB-AD, further comprising a moveable mechanism that allows the moveable portion to move between the first position and the second position.

AF: The cover as recited in any one of paragraphs AB-AE, further comprising a soundproof material located on the moveable portion.

AG: The cover as recited in any one of paragraphs AB-AF, further comprising one or more plugs located on the moveable portion.

AH: The cover as recited in any one of paragraphs AB-AG, wherein the moveable portion includes a slider that is configured to move between the first position and the second position.

AI: The cover as recited in any one of paragraphs AB-AH, wherein the moveable portion is configured to be disposed over a portion of an electronic device that is associated with receiving sound.

AJ: The cover as recited in any one of paragraphs AB-AI, wherein the first portion, the second portion, the third portion, and the fourth portion are configured to wrap around edges of an electronic device.

AK: A cover comprising: an elongated portion configured to wrap around edges an electronic device; and an enlarged portion configured to be disposed over one or more openings of the electronic device, the one or more openings associated with receiving sound.

AL: The cover as recited in paragraphs AK, further comprising a groove located within the elongated portion.

AM The cover as recited in either of paragraphs AK or AL, wherein the elongated portion includes a first thickness and the enlarged portion includes a second thickness, the second thickness being greater than the first thickness.

AN: The cover as recited in any one of paragraphs AK-AM, further comprising a soundproof material located on the enlarged portion.

What is claimed is:

1. A device cover comprising:
   a portion that is configured to secure the device cover to a voice-controlled device;
   one or more speakers;
   one or more microphones;
   one or more processors; and
   one or more computer-readable media storing instructions that, when executed by the one or more processors, cause the one or more processors to perform operations comprising:
   receiving first audio data using the one or more microphones;
   based at least in part on receiving the first audio data, causing the one or more speakers to output the sound;
   receiving second audio data using the one or more microphones; and
   based at least in part on receiving the second audio data, causing the one or more speakers to cease outputting the sound.

2. The device cover as recited in claim 1, wherein causing the one or more speakers to output the sound comprises causing the one or more speakers to output the sound such that the sound is received by one or more additional microphones of the voice-controlled device.

3. The device cover as recited in claim 1, wherein:
   the portion is configured to attach to a top of the voice-controlled device; and
   the one or more speakers are directed substantially towards one or more openings of the voice-controlled device, the one or more openings associated with receiving additional sound from an environment in at which the voice-controlled device is located.

4. The device cover as recited in claim 1, the operations further comprising:
   determining that the first audio data represents a first command, wherein causing the one or more speakers to output the sound is based at least in part on determining that the first audio data represents the first command; and
   determining that the second audio data represents a second command, wherein causing the one or more speakers to cease outputting the sound is based at least in part on determining that the second audio data represents the second command.

5. The device cover as recited in claim 1, further comprising one or more openings, the one or more openings for allowing additional sound to travel from outside of the device cover to the voice-controlled device.

6. A device cover comprising:
   a portion that is configured to attach to an electronic device;
   one or more speakers;
   one or more processors; and
   one or more computer-readable media storing instructions that, when executed by the one or more processors, cause the one or more processors to perform operations comprising:
   receiving a command; and
   based at least in part on receiving the command, causing the one or more speakers to output sound.

7. The device cover as recited in claim 6, further comprising:
   one or more microphones,
   and wherein receiving the command comprises generating audio data using the one or more microphones, the audio data representing the command.

8. The device cover as recited in claim 6, the operations further comprising:
   determining that the command is associated with outputting the sound, and wherein causing the one or more speakers to output the sound is based at least in part on the command being associated with outputting the sound.

9. The device cover as recited in claim 6, the operations further comprising:
receiving an additional command; and
based at least in part on receiving the additional command, causing the one or more speakers to cease outputting the sound.

10. The device cover as recited in claim 9, further comprising:
one or more microphones,
and wherein:
receiving the command comprises generating first audio data using the one or more microphones, the first audio data representing the command; and
receiving the additional command comprises generating second audio data using the one or more microphones, the second audio data representing the additional command.

11. The device cover as recited in claim 9, the operations further comprising:
determining that the command is associated with outputting the sound, wherein causing the one or more speakers to output the sound is based at least in part on the command being associated with outputting the sound; and
determining that the additional command is associated with ceasing outputting the sound, wherein causing the one or more speakers to cease outputting the sound is based at least in part on the additional command being associated with ceasing outputting the sound.

12. The device cover as recited in claim 6, wherein the one or more speakers are substantially directed towards the electronic device when the device cover is attached to the electronic device.

13. The device cover as recited in claim 6, wherein the device cover is configured such that the sound output by the one or more speakers travels through one or more openings of the electronic device, the one or more openings associated with one or more microphones of the electronic device.

14. The device cover as recited in claim 6, wherein the device cover is configured such that one or more microphones of the electronic device receive more of the sound output by the one or more speakers than additional sound located in an environment for which the electronic device is located.

15. The device cover as recited in claim 6, wherein the device cover is configured to attach to a top portion of the electronic device, the top portion of the electronic device for receiving the sound.

16. The device cover as recited in claim 6, further comprising one or more openings for allowing additional sound to travel from outside of the device cover to the electronic device.

17. The device cover as recited in claim 6, further comprising a power component that is configured to receive power from an external power source.

18. A device cover comprising:
a portion that is configured to secure the device cover to an electronic device;
one or more speakers;
one or more microphones;
one or more processors; and
one or more computer-readable media storing instructions that, when executed by the one or more processors, cause the one or more processors to perform operations comprising:
generating audio data using the one or more microphones;
based at least in part on the audio data, causing the one or more speakers to output sound.

19. The device cover as recited in claim 18, the operations further comprising:
generating additional audio data using the one or more microphones; and
based at least in part on the additional audio data, causing the one or more speakers to cease outputting the sound.

20. The device cover as recited in claim 19, the operations further comprising:
determining that the audio data represents a first command associated with outputting the sound, wherein causing the one or more speakers to output the sound is based at least in part on the first command; and
determining that the additional audio data represents a second command associated with ceasing outputting the sound, wherein causing the one or more speakers to cease outputting the sound is based at least in part on the second command.

* * * * *